(12) United States Patent
Hokao

(10) Patent No.: US 6,904,080 B1
(45) Date of Patent: Jun. 7, 2005

(54) RECEIVING CIRCUIT, MOBILE TERMINAL WITH RECEIVING CIRCUIT, AND METHOD OF RECEIVING DATA

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/404,704

(22) Filed: Sep. 23, 1999

(30) Foreign Application Priority Data

Sep. 29, 1998 (JP) .......... 10/275683

(51) Int. Cl.⁷ .......... H04B 15/00
(52) U.S. Cl. .......... 375/148; 455/76
(58) Field of Search .......... 375/148, 144, 375/140, 130, 136, 132, 349; 455/76, 136, 133, 132, 134, 135, 137, 140; 370/329, 331, 335, 342, 493, 494, 495

(56) References Cited

U.S. PATENT DOCUMENTS

| | | | |
|---|---|---|---|
| 5,267,261 A | * 11/1993 | Blakeney, II et al. .......... 375/1 |
| 5,559,838 A | * 9/1996 | Nakagoshi .......... 375/347 |
| 5,602,833 A | * 2/1997 | Zehavi .......... 370/209 |
| 5,608,722 A | * 3/1997 | Miller .......... 370/320 |
| 5,621,752 A | * 4/1997 | Antonio et al. .......... 375/144 |
| 5,889,815 A | * 3/1999 | Iwakiri .......... 375/205 |
| 5,970,084 A | * 10/1999 | Honda .......... 375/200 |
| 6,021,123 A | * 2/2000 | Mimura .......... 370/331 |
| 6,091,788 A | * 7/2000 | Keskitalo et al. .......... 375/347 |
| 6,216,004 B1 | * 4/2001 | Tiedemann, Jr. et al. ... 455/442 |
| 6,408,039 B1 | * 6/2002 | Ito .......... 375/347 |

FOREIGN PATENT DOCUMENTS

| | | | |
|---|---|---|---|
| EP | 0 704 985 A2 | 4/1996 | .......... H04B/1/707 |
| GB | 2 313 023 | 11/1997 | .......... H04B/1/707 |
| JP | 6-125329 | 5/1994 | .......... H04J/13/00 |
| JP | 7-231278 | 8/1995 | .......... H04B/1/707 |
| JP | 07231278 | 8/1995 | .......... H04B/1/707 |
| JP | 7-254871 | 10/1995 | .......... H04B/7/08 |
| JP | 07273689 | 10/1995 | .......... H04B/1/707 |
| JP | 7-273689 | 10/1995 | .......... H04B/1/707 |
| JP | 8-65233 | 3/1996 | .......... H04B/7/26 |

* cited by examiner

*Primary Examiner*—Mohammed Ghayour
*Assistant Examiner*—Dung X. Nguyen
(74) *Attorney, Agent, or Firm*—Scully, Scott, Murphy & Presser

(57) ABSTRACT

A receiving circuit has a speech/no-speech signal detector for detecting whether there is a speech signal or not based on data inversely diffused by finger receivers, and a clock controller for controlling operation of the finger receivers based on a detected result from the speech/no-speech signal detector. If a speech signal is detected by the speech/no-speech signal detector, then the clock controller controls all the finger receivers to operate. If no speech signal is detected by the speech/no-speech signal detector, then the clock controller controls only one or two of the finger receivers to operate.

59 Claims, 14 Drawing Sheets

RECEIVING CIRCUIT, MOBILE TERMINAL WITH RECEIVING CIRCUIT, AND METHOD OF RECEIVING DATA

BACKGROUND OF THE INVENTION

1. Field of the Invention

The present invention relates to a mobile communication system based on the principles of CDMA (Code Division Multiplex Access), and more particularly to a receiving circuit in a mobile terminal in a mobile communication system based on the principles of CDMA.

2. Description of the Related Art

In recent years, mobile communication systems are finding a growing number of subscribers and are required to increase their capacity to accommodate subscribers. One approach to an increased capacity to accommodate subscribers is a technique known as CDMA in which one frequency band is shared by signals spread by a plurality of mathematically orthogonal codes.

In a CDMA mobile communication system, the receiving circuit of each mobile terminal has a plurality of finger receivers for inversely diffusing transmitted data in association with respective multiple paths. The transmitted data are inversely diffused by the finger receivers and then synthesized with each other.

FIG. 1 of the accompanying drawings shows in block form a receiving circuit in a mobile terminal in a conventional mobile communication system.

As shown in FIG. 1, the receiving circuit comprises an antenna 1 and a radio unit 2 for receiving data, a plurality of finger receivers 3-1 through 3-n associated with respective multiple paths, for inversely diffusing the data received via the antenna 1 and the radio unit 2, a maximum ratio synthesizer 4 for synthesizing the data inversely diffused by the finger receivers 3-1 through 3-n, a search engine 5 for detecting respective components of the multiple paths, a timing controller 7 for controlling the timing of operation of the finger receivers 3-1 through 3-n, and a CPU 6 for controlling operation of the timing controller 7 based on the components detected by the search engine 5.

The receiving circuit shown in FIG. 1 operates as follows: When data is received by the antenna 1 and the radio unit 2, the data is inversely diffused by the finger receivers 3-1 through 3-n, and thereafter the inversely diffused data are synthesized by the maximum ratio synthesizer 4 into data which is outputted to a subsequent circuit (not shown).

When data is received by the antenna 1 and the radio unit 2, all the finger receivers 3-1 through 3-n are in operation.

In the conventional receiving circuit, however, since the all the finger receivers 3-1 through 3-n operate even if the received data contains no speech signal, the receiving circuit causes a wasteful consumption of current when the received data contains no speech signal.

SUMMARY OF THE INVENTION

It is therefore an object of the present invention to provide a receiving circuit which is capable of reducing a consumed current when received data contains no speech signal.

To achieve the above object, there is provided in accordance with the present invention a receiving circuit comprising an antenna and a radio unit for receiving a signal transmitted vie a radio link, a plurality of finger receivers for inversely diffusing the signal received by antenna and the radio unit in association with respective multiple paths, a synthesizer for synthesizing signals inversely diffused by the finger receivers, and means for controlling the number of finger receivers to operate, among the plurality of finger receivers, based on whether or not a speech signal or data is contained in the signal received by antenna and the radio unit.

The receiving circuit may further comprise means for controlling the number of finger receivers to operate if a speech signal or data is not contained in the signal received by antenna and the radio unit, based on the number of base stations which are communicating with the receiving circuit.

The receiving circuit may further comprise means for controlling the number of finger receivers to operate if a speech signal or data is not contained in the signal received by antenna and the radio unit, based on whether the receiving circuit is in a soft hand-over mode or not.

The receiving circuit may further comprise means for operating as many finger receivers as the number of base stations which are communicating with the receiving circuit if the receiving circuit is in the soft hand-over mode, and operating a minimum number of finger receivers required to detect whether or not a speech signal or data is contained in the signal received by antenna and the radio unit, if the receiving circuit is not in the soft hand-over mode.

The receiving circuit may further comprise means for controlling the number of finger receivers to operate by controlling the supply of a clock signal to the plurality of finger receivers.

According to the present invention, there is also provided a receiving circuit comprising an antenna and a radio unit for receiving data, a plurality of finger receivers for inversely diffusing the data received by antenna and the radio unit in association with respective multiple paths, a synthesizer for synthesizing signals inversely diffused by the finger receivers, detecting means for detecting whether there is a speech signal or not based on the data inversely diffused by the finger receivers, and control means for controlling the number of finger receivers to operate, among the plurality of finger receivers, based on a detected result from the detecting means.

The control means may comprise means for operating all the finger receivers if a speech signal is detected by the detecting means.

At least one of the finger receivers is operated at all times without being controlled by the control means, and the detecting means may comprise means for detecting whether there is a speech signal or not based on the data inversely diffused by the at least one of the finger receivers.

Alternatively, at least two of the finger receivers are operated at all times without being controlled by the control means, and the detecting means may comprise means for detecting whether there is a speech signal or not based on the data inversely diffused by the at least two of the finger receivers.

The detecting means may comprise a plurality of detecting means associated with the plurality of finger receivers, respectively.

The control means may comprise means for operating, at all times, one of the plurality of finger receivers which has a highest correlated value, and controlling operation of the other finger receivers based on a detected result from the detecting means associated with the one of the finger receivers.

The detecting means may comprise two detecting means associated respectively with two of the plurality of finger receivers, and the control means may comprise means for operating the two finger receivers associated with the two detecting means at all times irrespective of detected results from the detecting means and controlling operation of the other finger receivers based on the detected results from the detecting means if the receiving circuit is in a hand-over mode, and operating one of the two finger receivers associated with the two detecting means at all times irrespective of detected results from the detecting means and controlling operation of the other finger receivers based on the detected results from the detecting means if the receiving circuit is not in the hand-over mode.

The control means may comprise means for operating, at all times, two of the plurality of finger receivers which have a highest correlated value irrespective of detected results from the detecting means, and controlling operation of the other finger receivers based on detected results from the detecting means associated with the two of the finger receivers, if the receiving circuit is in a hand-over mode, and operating, at all times, one of the plurality of finger receivers which has a highest correlated value irrespective of detected results from the detecting means, and controlling operation of the other finger receivers based on a detected result from the detecting means associated with the one of the finger receivers, if the receiving circuit is not in the hand-over mode.

According to the present invention, there is further provided a receiving circuit comprising an antenna and a radio unit for receiving data, a plurality of finger receivers for inversely diffusing the data received by antenna and the radio unit in association with respective multiple paths, a synthesizer for synthesizing signals inversely diffused by the finger receivers, a decoder for decoding the data synthesized by the synthesizer, detecting means for detecting whether there is a speech signal or not based on the data decoded by the decoder, and control means for controlling the number of finger receivers to operate, among the plurality of finger receivers, based on a detected result from the detecting means.

The control means may comprise means for operating all the finger receivers if a speech signal is detected by the detecting means.

The control means may comprise means for operating, at all times, one of the plurality of finger receivers which has a highest correlated value.

The control means may comprise means for controlling operation of the plurality of finger receivers by controlling the supply of a clock signal to the plurality of finger receivers.

According to the present invention, there is further provided a mobile terminal in a mobile communication system, the mobile terminal having the receiving circuit described above.

According to the present invention, there is also provided a method of receiving data by inversely diffusing a signal received by an antenna and a radio unit with a plurality of receivers of a receiving circuit in association with respective multiple paths, synthesizing inversely diffused signals, and outputting a synthesized signal, comprising the step of controlling the number of receivers to operate, among the plurality of receivers, based on whether or not a speech signal or data is contained in the signal received by the antenna and the radio unit.

The method may further comprise the step of controlling the number of receivers to operate if a speech signal or data is not contained in the signal received by antenna and the radio unit, based on the number of base stations which are communicating with the receiving circuit.

The method may further comprise the step of controlling the number of receivers to operate if a speech signal or data is not contained in the signal received by antenna and the radio unit, based on whether the receiving circuit is in a soft hand-over mode or not.

The method may further comprise the steps of operating as many finger receivers as the number of base stations which are communicating with the receiving circuit if the receiving circuit is in the soft hand-over mode, and operating a minimum number of finger receivers required to detect whether or not a speech signal or data is contained in the signal received by antenna and the radio unit, if the receiving circuit is not in the soft hand-over mode.

The method may further comprise the step of controlling the number of receivers to operate by controlling the supply of a clock signal to the plurality of receivers.

According to the present invention, there is also provided a method of receiving data by inversely diffusing data received by an antenna and a radio unit with a plurality of receivers of a receiving circuit in association with respective multiple paths, synthesizing inversely diffused data, and outputting synthesized data, comprising the steps of detecting whether there is a speech signal or not based on the inversely diffused data, and controlling the number of receivers to operate, among the plurality of receivers, based on a detected result of whether there is a speech signal or not.

The method may further comprise the step of operating all the receivers if a speech signal is detected.

The method may further comprise the step of operating at least one of the plurality of receivers at all times.

The method may further comprise the step of operating at least two of the plurality of receivers at all times.

The method may further comprise the step of operating, at all times, one of the plurality of receivers which has a highest correlated value.

The method may further comprise the steps of operating at least two of the receivers at all times if the receiving circuit is in a hand-over mode, and operating one of the receivers at all times if the receiving circuit is not in the hand-over mode.

The method may further comprise the steps of operating two of the receivers which have a highest correlated value at all times if the receiving circuit is in the hand-over mode, and operating one of the receivers which has a highest correlated value at all times if the receiving circuit is not in the hand-over mode.

According to the present invention, there is further provided a method of receiving data by inversely diffusing data received by an antenna and a radio unit with a plurality of receivers of a receiving circuit in association with respective multiple paths, synthesizing inversely diffused data, decoding synthesized data, and outputting decoded data, comprising the steps of detecting whether there is a speech signal or not based on the decoded data, and controlling the number of receivers to operate, among the plurality of receivers, based on a detected result of whether there is a speech signal or not.

The method may further comprise the step of operating all the receivers if a speech signal is detected.

The method may further comprise the step of operating, at all times, one of the plurality of receivers which has a highest correlated value.

The method may further comprise the step of controlling operation of the plurality of receivers by controlling the supply of a clock signal to the plurality of receivers.

With the arrangement of the present invention, as described above, the detecting means detects whether there is a speech signal or not based on data inversely diffused by the finger receivers, and the number of finger receivers to operate, among the plurality of finger receivers, is controlled on the basis of a detected result.

Specifically, if the detecting means detects a speech signal, then all the finger receivers are controlled to operate, and if the detecting means detects no speech signal, then a minimum number of finger receivers, preferably one or two finger receivers, which are required to detect whether there is a speech signal or not, are controlled to operate.

Consequently, the receiving circuit does not consume a wasteful current when the received data contains no speech signal.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
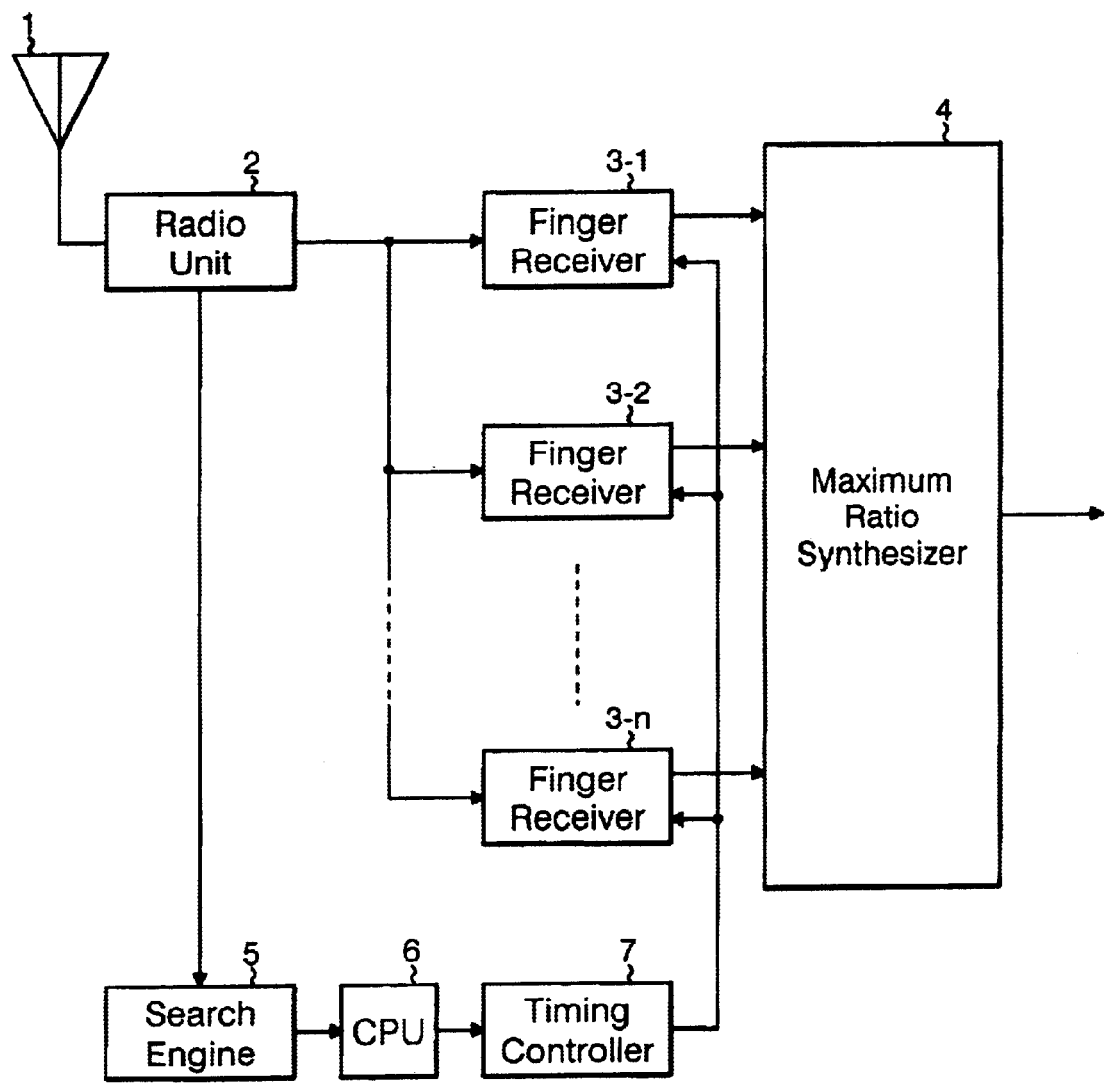
FIG. 1 is a block diagram of a receiving circuit in a mobile terminal in a conventional mobile communication system.
Figure 2:
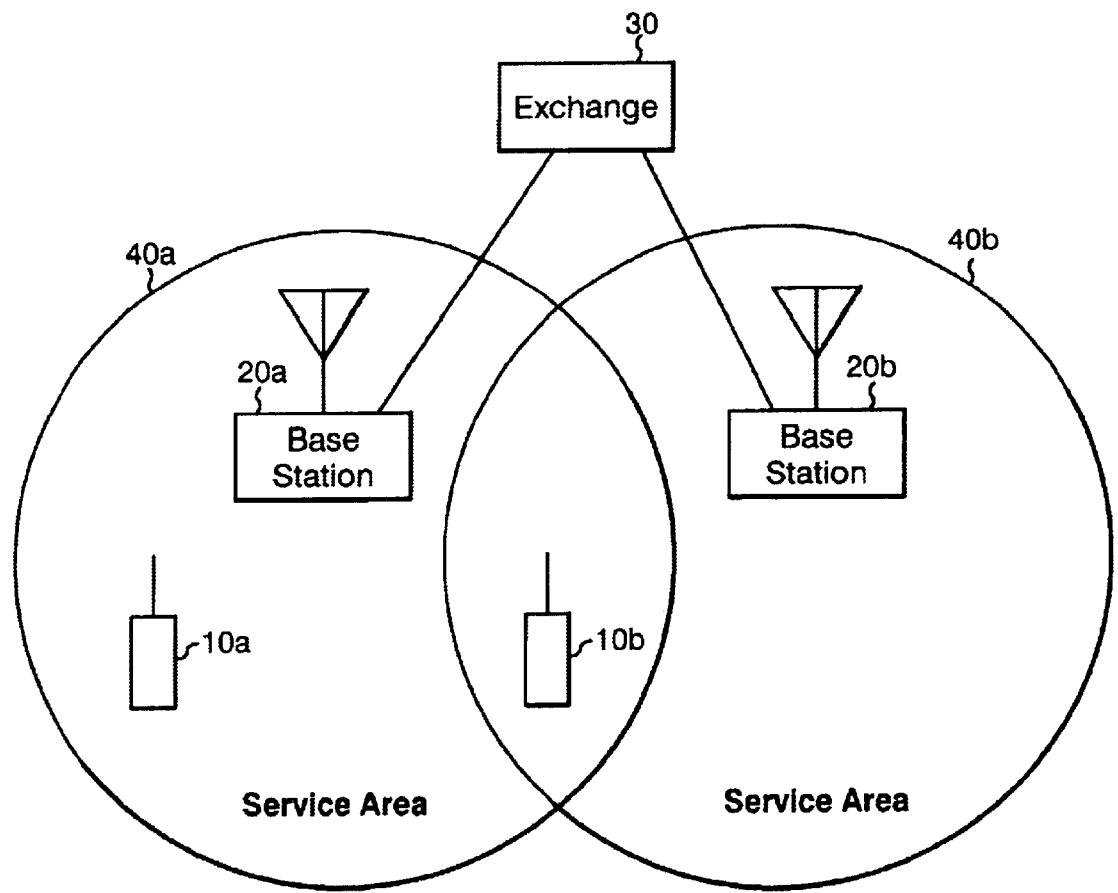
FIG. 2 is a diagram of a mobile communication system including mobile terminals each having a receiving circuit according to the present invention.

FIG. 2 shows a mobile communication system including mobile terminals each having a receiving circuit according to the present invention.

Figure 12:
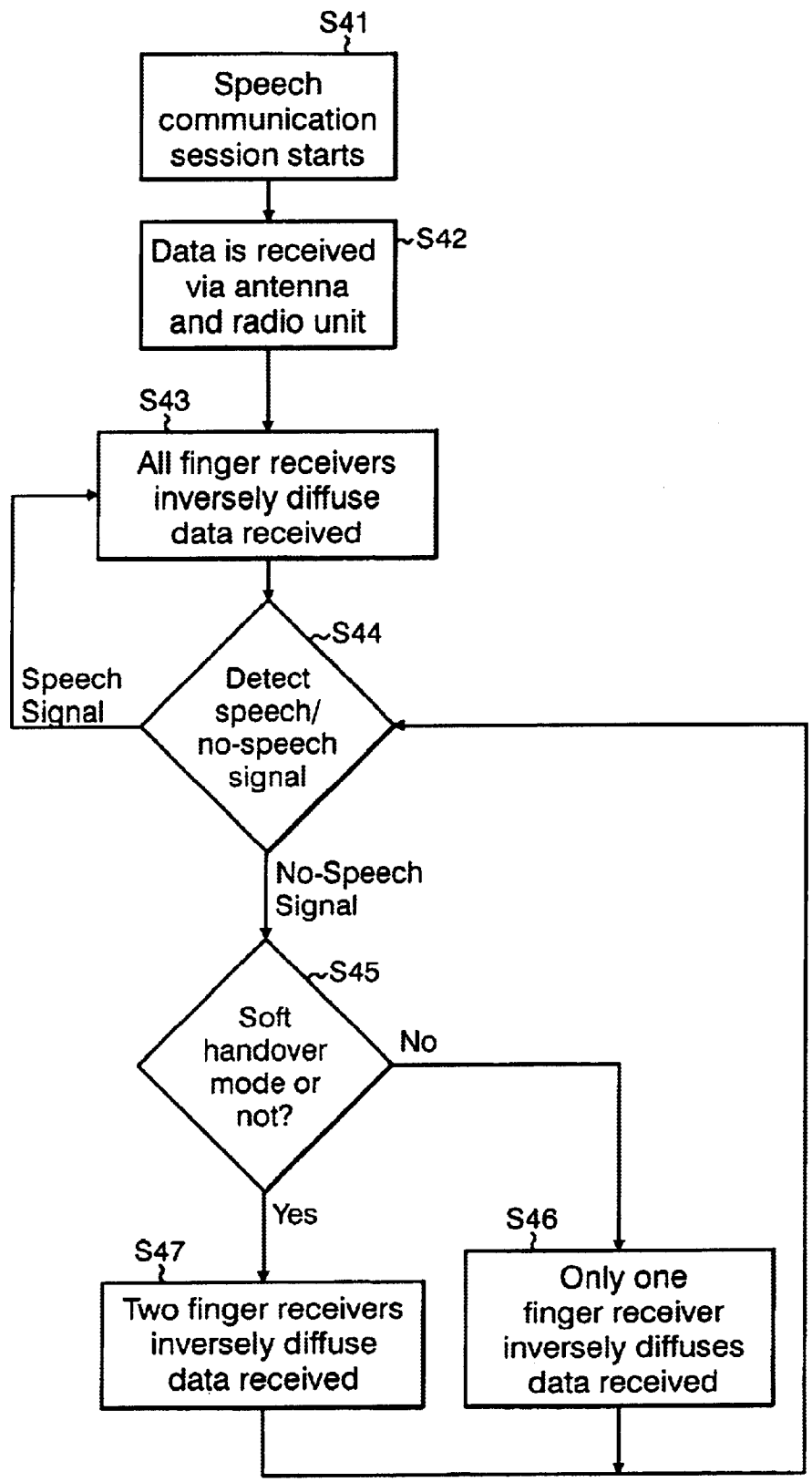
FIG. 12 is a flowchart of an operation sequence of the receiving circuit shown in FIG. 11.

As shown in FIG. 12, the mobile communication system has a plurality of mobile terminals 10a, 10b each having a receiving circuit according to the present invention, a plurality of base stations 20a, 20b covering respective service areas 40a, 40b and connected to the mobile terminals 10a, 10b via radio links, and an exchange 30 for performing switching control for the base stations 20a, 20b. Though only two base stations 20a, 20b and two base stations 20a, 20b are illustrated in FIG. 2, the mobile communication system actually has a plurality of mobile terminals more than two mobile stations and a plurality of base stations more than two base stations.

When the mobile terminals 10a, 10b are present in the service area 40a covered by the base station 20a, the mobile terminals 10a, 10b receive a service from the base station 20a. When the mobile terminals 10a, 10b are present in the service area 40b covered by the base station 20b, the mobile terminals 10a, 10b receive a service from the base station 20b. When the mobile terminals 10a, 10b are present in the vicinity of a boundary between a plurality of service areas, the mobile terminals 10a, 10b communicate with a plurality of base stations (soft hand-over).

Embodiments of the receiving circuit in each of the mobile terminals 10a, 10b will be described in detail below.

Figure 3:
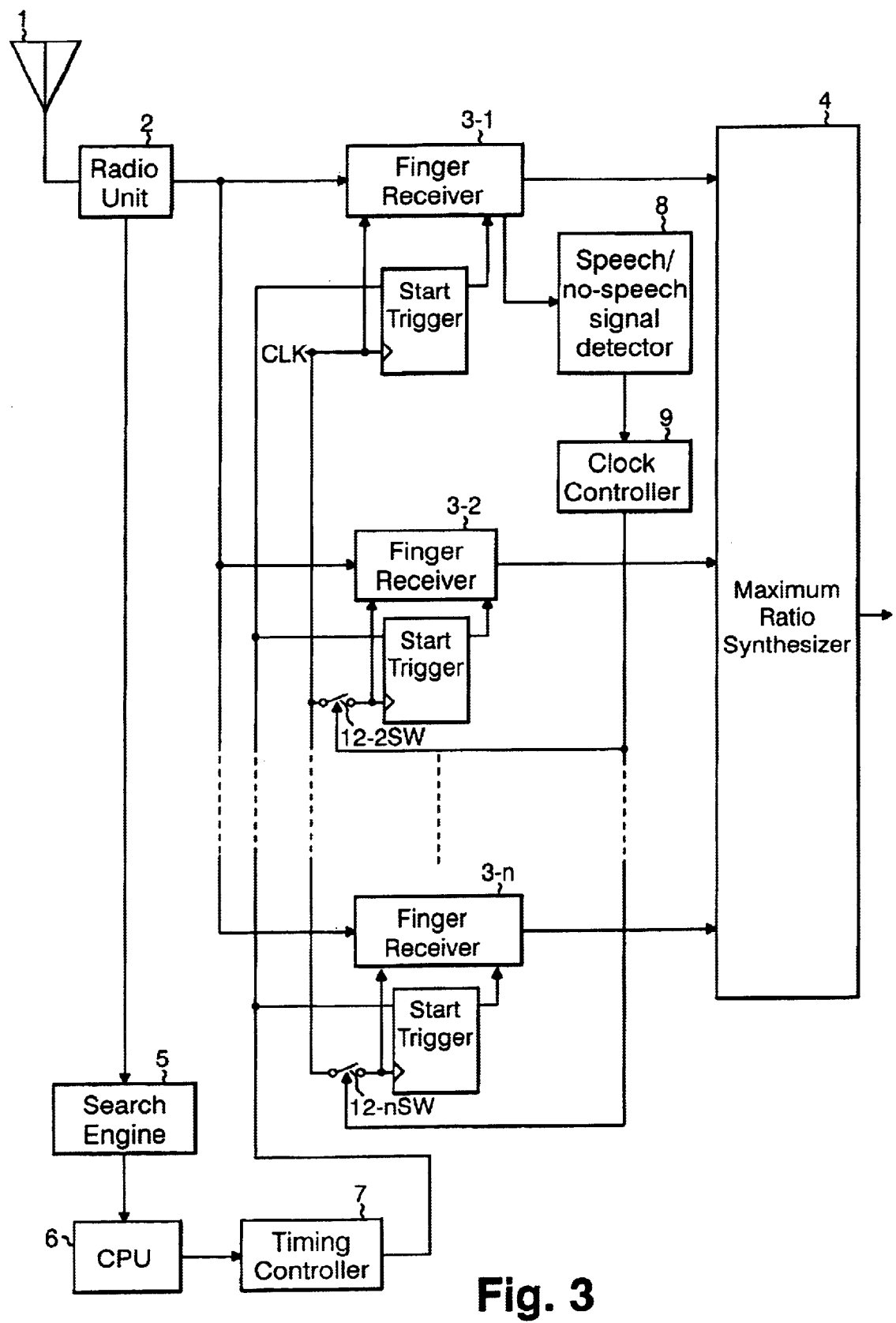
FIG. 3 is a block diagram of a receiving circuit according to a first embodiment of the present invention.

1st Embodiment:

FIG. 3 shows in block form a receiving circuit according to a first embodiment of the present invention.

As shown in FIG. 3, the receiving circuit comprises an antenna 1 and a radio unit 2 for receiving data, a plurality of finger receivers 3-1 through 3-n for being supplied with the data received via the antenna 1 and the radio unit 2 and inversely diffusing the data in association with a plurality of multiple paths, a maximum ratio synthesizer 4 for synthesizing the data inversely diffused by the finger receivers 3-1 through 3-n, a search engine 5 for detecting respective components of the multiple paths, a timing controller 7 for controlling the timing of operation of the finger receivers 3-1 through 3-n, a CPU 6 for controlling operation of the timing controller 7 based on the components detected by the search engine 5, a speech/no-speech signal detector 8 for detecting whether there is a speech signal or not based on the data inversely diffused by the finger receiver 3-1, a clock controller 9 as control means for controlling the supply of a clock signal to the finger receivers 3-2 through 3-n based on a detected result from the speech/no-speech signal detector 8, and a plurality of switches 12-2 through 12-n for switching on and off the supply of the clock signal to the finger receivers 32 through 3-n under the control of the clock controller 9. The timing controller 7 outputs a frame signal at all times to the finger receivers 3-1 through 3-n for keeping the finger receivers 3-1 through 3-n in synchronism with each other.

A process of controlling operation of the finger receivers 3-1 through 3-n in the receiving circuit shown in FIG. 3 will be described below.

Figure 4:
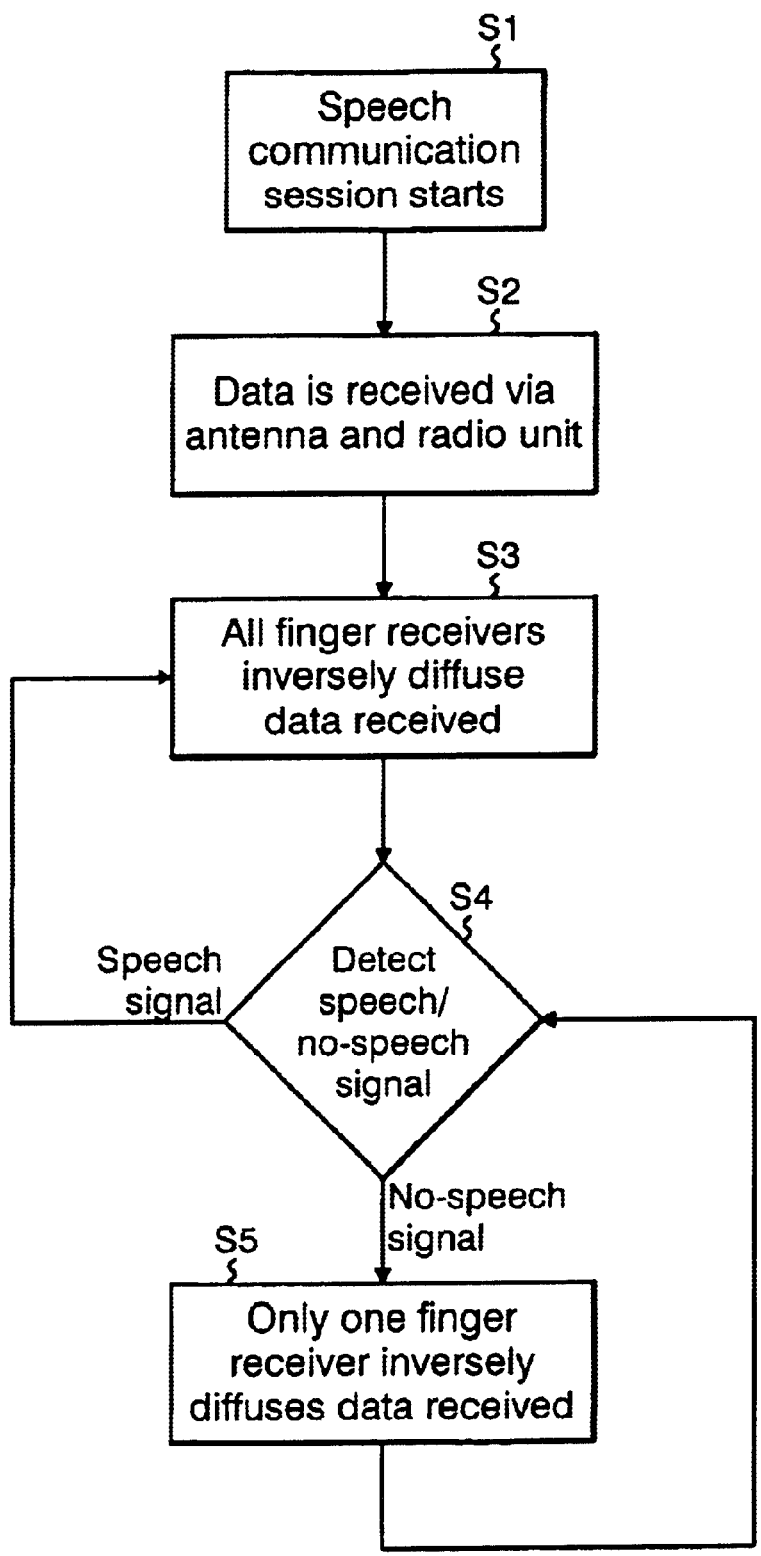
FIG. 4 is a flowchart of an operation sequence of the receiving circuit shown in FIG. 3.

FIG. 4 shows an operation sequence of the receiving circuit shown in FIG. 3.

As shown in FIG. 4, a speech communication session starts between the base station 20a (see FIG. 2) and the mobile terminal 10a (see FIG. 2) in step S1, and data is received via the antenna 1 and the radio unit 2 in step S2. The clock controller 9 turns on or connects all the switches 12-2 through 12-n, supplying the clock signal to all the finger receivers 3-1 through 3-n. The finger receivers 3-1 through 3-n now inversely diffuse the data received via the antenna 1 and the radio unit 2 in step S3.

Then, the speech/no-speech signal detector 8 detects whether there is a speech signal based on the data inversely diffused by the finger receiver 3-1 in step S4. If a speech signal is detected, then control returns to step S3, in which the finger receivers 3-1 through 3-n inversely diffuse the data received via the antenna 1 and the radio unit 2.

If no speech signal is detected in step S4, then the clock controller 9 turns off or disconnect the switches 12-2 through 12-n, supplying no clock signal to the finger receivers 3-2 through 3-n.

The finger receivers 3-2 through 3-n are inactivated, and the data received via the antenna 1 and the radio unit 2 is inversely diffused by only the finger receiver 3-1 in step S5.

Control then goes back to step S4, in which the speech/no-speech signal detector 8 detects whether there is a speech signal based on the data inversely diffused by the finger receiver 3-1.

2nd Embodiment:

In the first embodiment described above, the receiving circuit has a single speech/no-speech signal detector, and the finger receiver connected to the speech/no-speech signal detector operates at all times. The speech/no-speech signal detector detects whether there is a speech signal or not based on the data supplied to the finger receiver connected to the speech/no-speech signal detector, and operation of the other finger receivers is controlled on the basis of a detected result from the speech/no-speech signal. detector. However, a plurality of speech/no-speech signal detectors may be connected respectively to the finger receivers, and the finger receiver with a highest correlated value may operate at all times, with the other finger receivers being controlled in operation based on a detected result from the speech/no-speech signal detector that is connected to the finger receiver in operation at all times.

Figure 5:
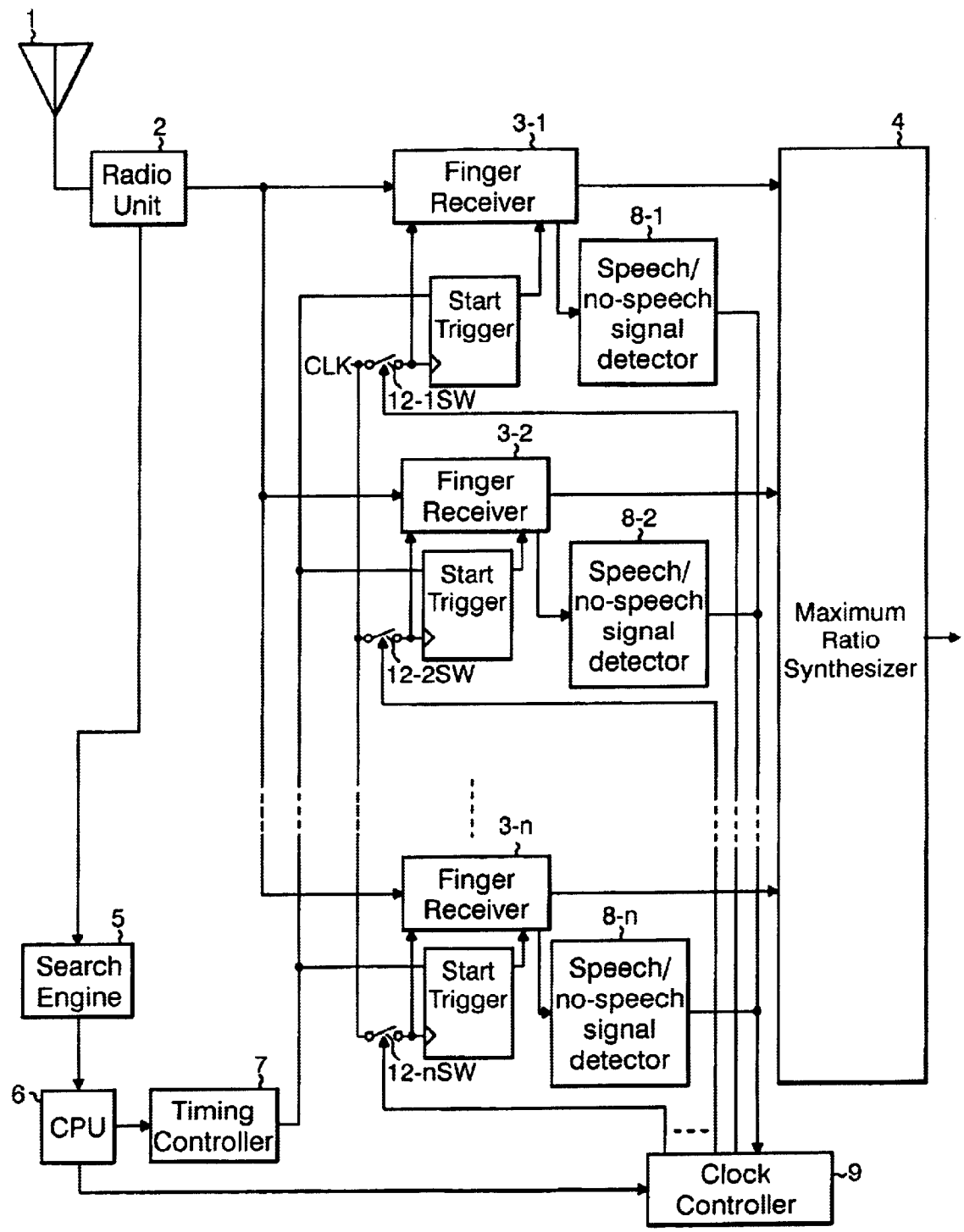
FIG. 5 is a block diagram of a receiving circuit according to a second embodiment of the present invention.

FIG. 5 shows in block form a receiving circuit according to a second embodiment of the present invention.

As shown in FIG. 5, the receiving circuit comprises an antenna 1 and a radio unit 2 for receiving data, a plurality of finger receivers 3-1 through 3-n for being supplied with the data received via the antenna 1 and the radio unit 2 and inversely diffusing the data in association with a plurality of multiple paths, a maximum ratio synthesizer 4 for synthesizing the data inversely diffused by the finger receivers 3-1 through 3-n, a search engine 5 for detecting respective components of the multiple paths, a timing controller 7 for controlling the timing of operation of the finger receivers 3-1 through 3-n, a CPU 6 for controlling operation of the timing controller 7 based on the components detected by the search engine 5, a plurality of speech/no-speech signal detectors 8-1 through 8-n for detecting whether there is a speech signal or not based on the data inversely diffused by the respective finger receivers 3-1 through 3-n, a clock controller 9 for controlling the supply of a clock signal to the finger receivers 3-1 through 3-n under the control of the CPU 6 or based on detected results from the speech/no-speech signal detectors 8-1 through 8-n, and a plurality of switches 12-1 through 12-n for switching on and off the supply of the clock signal to the finger receivers 3-1 through 3-n under the control of the clock controller 9. The timing controller 7 outputs a frame signal at all times to the finger receivers 3-1 through 3-n for keeping the finger receivers 3-1 through 3-n in synchronism with each other.

A process of controlling operation of the finger receivers 3-1 through 3-n in the receiving circuit shown in FIG. 5 will be described below.

Figure 6:
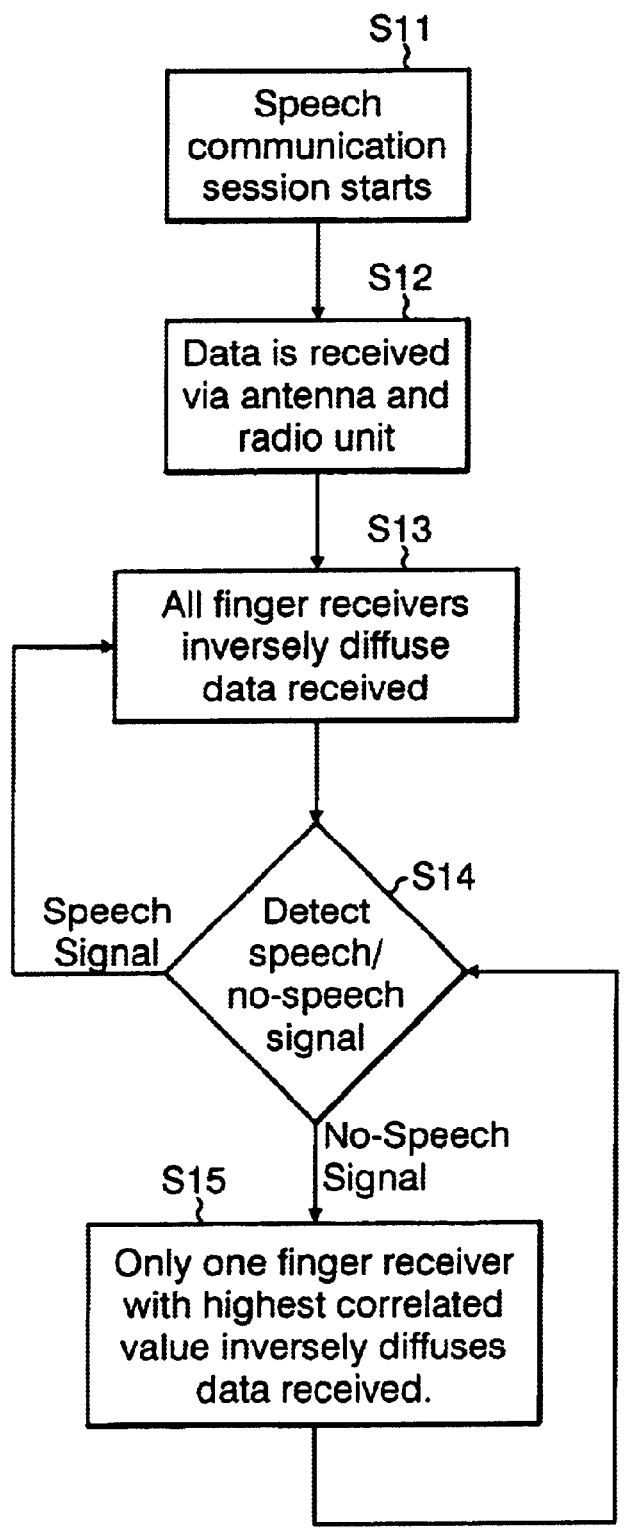
FIG. 6 is a flowchart of an operation sequence of the receiving circuit shown in FIG. 5.

FIG. 6 shows an operation sequence of the receiving circuit shown in FIG. 5.

As shown in FIG. 6, a speech communication session starts between the base station 20a (see FIG. 2) and the mobile terminal 10a (see FIG. 2) in step S11, and data is received via the antenna 1 and the radio unit 2 in step S12. The clock controller 9 turns on or connects all the switches 12-1 through 12-n, supplying the clock signal to all the finger receivers 3-1 through 3-n. The finger receivers 3-1 through 3-n now inversely diffuse the data received via the antenna 1 and the radio unit 2 in step S13.

Then, the speech/no-speech signal detectors 8-1 through 8-n detect whether there is a speech signal based on the data inversely diffused by the finger receivers 3-1 through 3-n in step S14. If a speech signal is detected, then control returns to step S13, in which the finger receivers 3-1 through 3-n inversely diffuse the data received via the antenna 1 and the radio unit 2.

If no speech signal is detected in step S14, then the finger receiver whose correlated value is highest, among the finger receivers 3-1 through 3-n, is indicated from the CPU 6 to the clock controller 9, which controls the switches 12-2 through 12-n to supply the clock signal to the finger receiver whose correlated value is highest and supply no clock signal to the other finger receivers.

If it is assumed that the finger receiver 3-1 has the highest correlated value, then the clock controller 9 connects or closes the switch 12-1 and disconnects or opens the switches 12-2 through 12-n, so that the clock signal is supplied to the finger receiver 3-1 and no clock signal is supplied to the finger receivers 3-2 through 3-n.

The finger receivers 3-2 through 3-n are inactivated, and the data received via the antenna 1 and the radio unit 2 is inversely diffused by only the finger receiver 3-1 in step S15.

Control then goes back to step S14, in which the speech/no-speech signal detector 8 detects whether there is a speech signal based on the data inversely diffuse by the finger receiver 3-1.

3rd Embodiment:

In the first and second embodiments described above, speech signal or no speed data is detected before the received data is decoded. However, it is possible to detect speech signal or no speed data after the received data is decoded, and control operation of the finger receivers based on a detected result of speech signal or no speed data.

Figure 7:
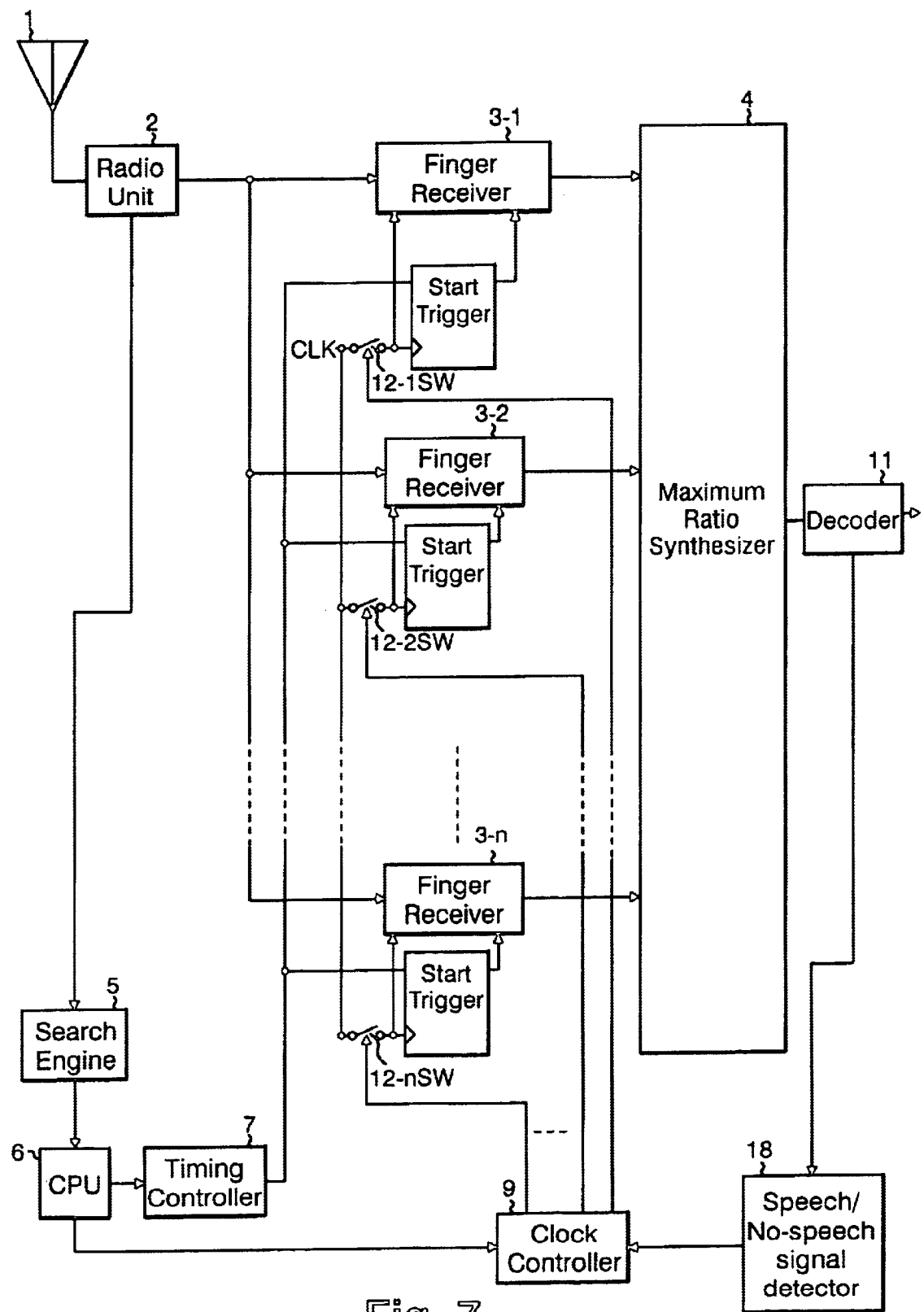
FIG. 7 is a block diagram of a receiving circuit according to a third embodiment of the present invention.

FIG. 7 shows in block form a receiving circuit according to a third embodiment of the present invention.

As shown in FIG. 7, the receiving circuit comprises an antenna 1 and a radio unit 2 for receiving data, a plurality of finger receivers 3-1 through 3-n for being supplied with the data received via the antenna 1 and the radio unit 2 and inversely diffusing the data in association with a plurality of multiple paths, a maximum ratio synthesizer 4 for synthesizing the data inversely diffused by the finger receivers 3-1 through 3-n, a search engine 5 for detecting respective components of the multiple paths, a timing controller 7 for controlling the timing of operation of the finger receivers 3-1 through 3-n, a CPU 6 for controlling operation of the timing controller 7 based on the components detected by the search engine 5, a decoder 11 for Viterbi-decoding the data synthesized by the maximum ratio synthesizer 4, a speech/no-speech signal detector 18 as detecting means for detecting whether there is a speech signal or not based on the data decoded by the decoder 11, a clock controller 9 for controlling the supply of a clock signal to the finger receivers 3-2 through 3-n under the control of the CPU 6 or based on a detected result from the speech/no-speech signal detector 18, and a plurality of switches 12-1 through 12-n for switching on and off the supply of the clock signal to the finger receivers 3-1 through 3-n under the control of the clock controller 9. The timing controller 7 outputs a frame signal at all times to the finger receivers 3-1 through 3-n for keeping the finger receivers 3-1 through 3-n in synchronism with each other.

A process of controlling operation of the finger receivers 3-1 through 3-n in the receiving circuit shown in FIG. 7 will be described below.

Figure 8:
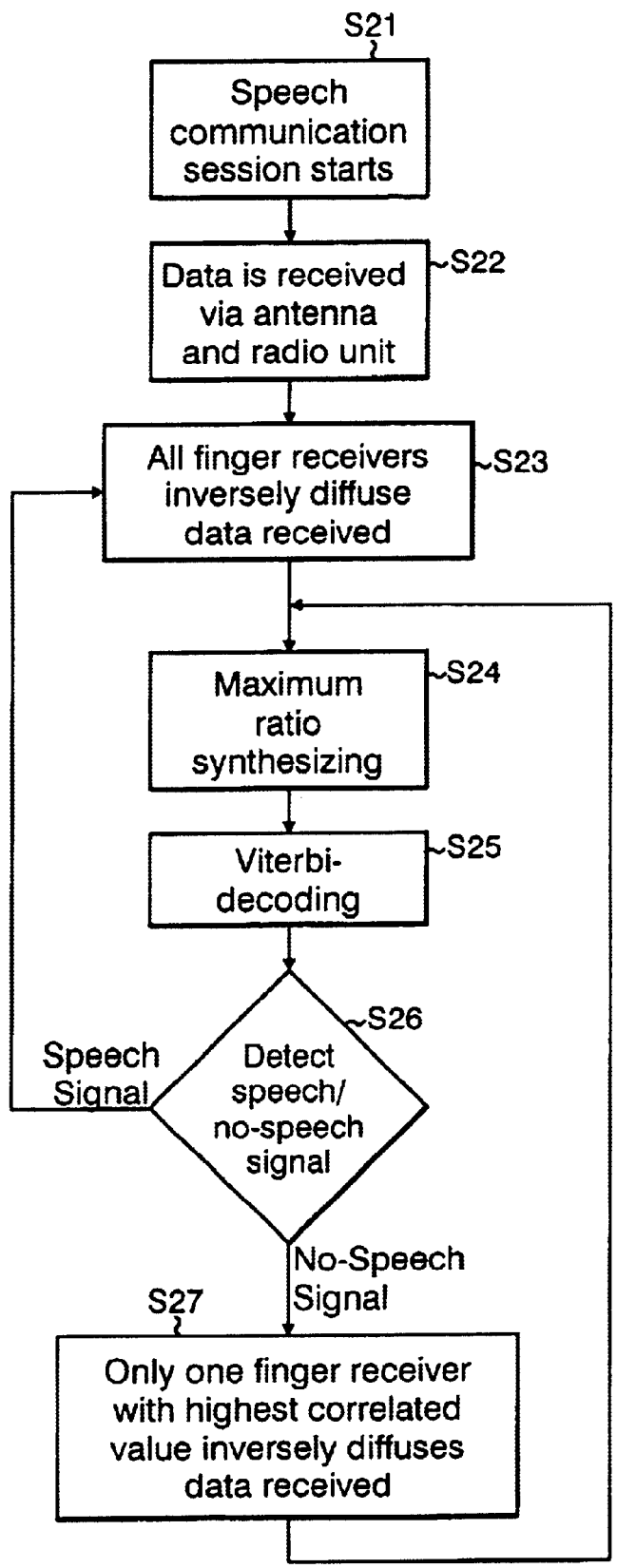
FIG. 8 is a flowchart of an operation sequence of the receiving circuit shown in FIG. 7.

FIG. 8 shows an operation sequence of the receiving circuit shown in FIG. 7.

As shown in FIG. 7, a speech communication session starts between the base station 20a (see FIG. 2) and the mobile terminal 10a (see FIG. 2) in step S21, and data is received via the antenna 1 and the radio unit 2 in step S22. The clock controller 9 turns on or connects all the switches 12-1 through 12-n, supplying the clock signal to all the finger receivers 3-1 through 3-n. The finger receivers 3-1 through 3-n now inversely diffuse the data received via the antenna 1 and the radio unit 2 in step S23.

Then, the maximum ratio synthesizer 4 synthesizes the data inversely diffused by the finger receivers 3-1 through 3-n in step S24.

The decoder 11 Viterbi-decodes the data synthesized by the maximum ratio synthesizer 4 and outputs the decoded data in step S25.

Then, the speech/no-speech signal detector 18 detects whether there is a speech signal based on the data outputted from the decoder 11 in step S26. If a speech signal is detected, then control returns to step S23, in which the finger receivers 3-1 through 3-n inversely diffuse the data received via the antenna 1 and the radio unit 2.

If no speech signal is detected in step S26, then the finger receiver whose correlated value is highest, among the finger receivers 3-1 through 3-n, is indicated from the CPU 6 to the clock controller 9, which controls the switches 12-2 through 12-n to supply the clock signal to the finger receiver whose correlated value is highest and supply no clock signal to the other finger receivers.

If it is assumed that the finger receiver 3-1 has the highest correlated value, then the clock controller 9 connects the switch 12-1 and disconnects the switches 12-2 through 12-n, so that the clock signal is supplied to the finger receiver 3-1 and no clock signal is supplied to the finger receivers 3-2 through 3-n.

The finger receivers 3-2 through 3-n are inactivated, and the data received via the antenna 1 and the radio unit 2 is inversely diffused by only the finger receiver 3-1 in step S27.

The data inversely diffused by the finger receiver 3-1 is supplied via the maximum ratio synthesizer 4 to the decoder 11, which Viterbi-decodes the data. Thereafter, the speech/no-speech signal detector 18 detects whether there is a speech signal based on the data outputted from the decoder 11.

In the third embodiment, the finger receiver whose correlated value is highest is operated as with the second embodiment. However, a predetermined finger receiver may be operated as with the first embodiment.

4th Embodiment:

In the mobile communication system, when a mobile terminal, like the mobile terminal 10b shown in FIG. 2, is present in a region where the service areas 40a, 40b of the two base stations 20a, 20b overlap each other, the mobile terminal is in a soft hand-over mode in which it receives the services from at least the two base stations.

In that region, therefore, it is necessary that at least two finger receivers of the mobile terminal be operated.

Figure 9:
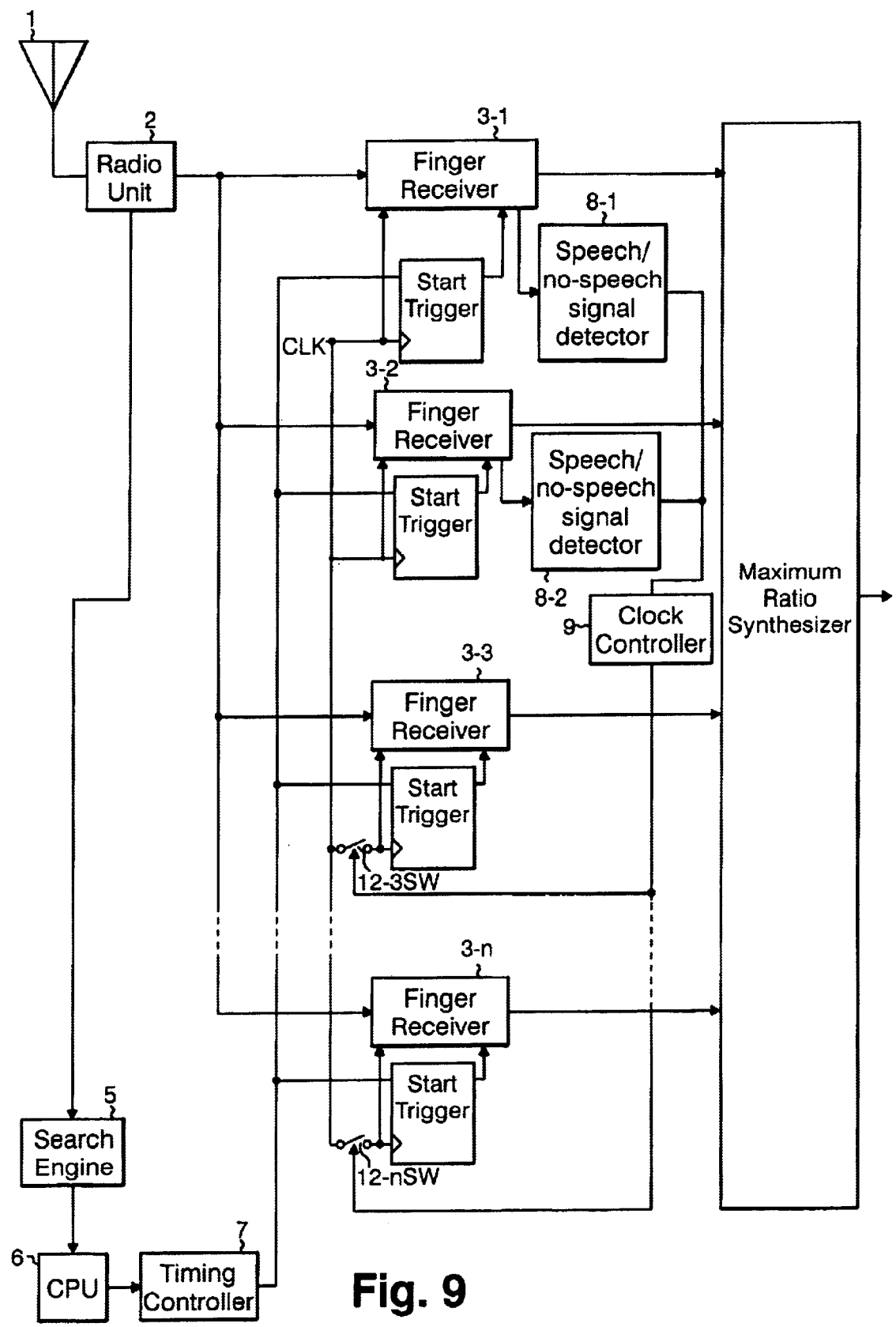
FIG. 9 is a block diagram of a receiving circuit according to a fourth embodiment of the present invention.

FIG. 9 shows in block form a receiving circuit according to a fourth embodiment of the present invention.

As shown in FIG. 9, the receiving circuit comprises an antenna 1 and a radio unit 2 for receiving data, a plurality of finger receivers 3-1 through 3-n for being supplied with the data received via the antenna 1 and the radio unit 2 and inversely diffusing the data in association with a plurality of multiple paths, maximum ratio synthesizer 4 for synthesizing the data inversely diffused by the finger receivers 3-1 through 3-n, a search engine 5 for detecting respective components of the multiple paths, a timing controller 7 for controlling the timing of operation of the finger receivers 3-1 through 3-n, a CPU 6 for controlling operation of the timing controller 7 based on the components detected by the search engine 5, a pair of speech/no-speech signal detectors 8-1, 8-2 for detecting whether there is a speech signal or not based on the respective data inversely diffused by the finger receivers 3-1, 3-2, a clock controller 9 for controlling the supply of a clock signal to the finger receivers 3-2 through 3-n based on detected results from the speech/no-speech signal detectors 8-1, 8-2, and a plurality of switches 12-3 through 12-n for switching on and off the supply of the clock signal to the finger receivers 3-3 through 3-n under the control of the clock controller 9. The timing controller 7 outputs a frame signal at all times to the finger receivers 3-1 through 3-n for keeping the finger receivers 3-1 through 3-n in synchronism with each other.

A process of controlling operation of the finger receivers 3-1 through 3-n in the receiving circuit shown in FIG. 9 will be described below.

Figure 10:
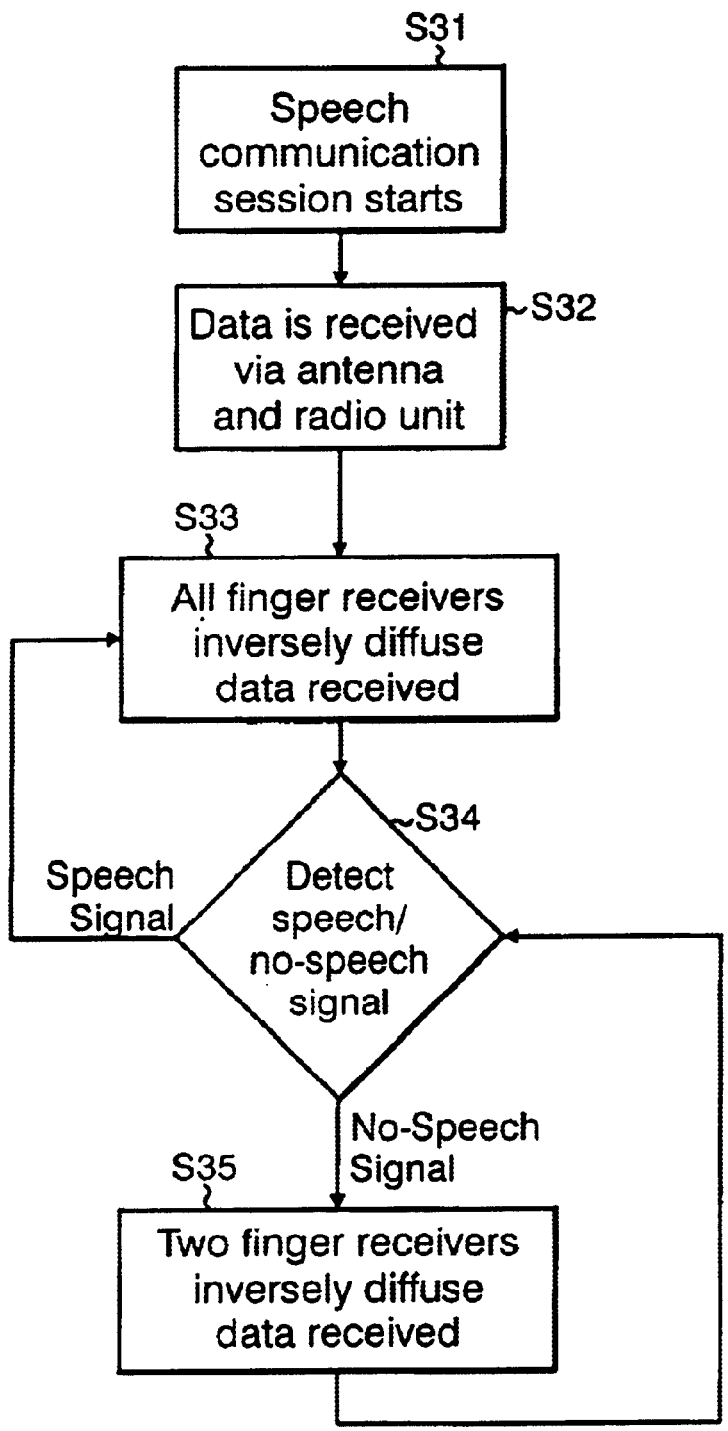
FIG. 10 is a flowchart of an operation sequence of the receiving circuit shown in FIG. 9.

FIG. 10 shows an operation sequence of the receiving circuit shown in FIG. 9.

As shown in FIG. 10, a speech communication session starts between the base station 20a (see FIG. 2) and the mobile terminal 10a (see FIG. 2) in step S31, and data is received via the antenna 1 and the radio unit 2 in step S32. The clock controller 9 turns on or connects all the switches 12-3 through 12-n, supplying the clock signal to all the finger receivers 3-1 through 3-n. The finger receivers 3-1 through 3-n now inversely diffuse the data received via the antenna 1 and the radio unit 2 in step S33.

Then, the speech/no-speech signal detectors 8-1, 8-2 detect whether there is a speech signal based on the data inversely diffused by the finger receivers 3-1, 3-2 in step S34. If a speech signal is detected by at least one of the finger receivers 3-1, 3-2, then control returns to step S33, in which the finger receivers 3-1 through 3-n inversely diffuse the data received via the antenna 1 and the radio unit 2.

If no speech signal is detected by both the finger receivers 3-1, 3-2 in step S34, then the clock controller 9 disconnects the switches 12-3 through 12-n to supply no clock signal to the finger receivers 3-3 through 3-n.

The finger receivers 3-3 through 3-n are inactivated, and the data received via the antenna 1 and the radio unit 2 is inversely diffused by only the finger receivers 3-1, 3-2 in step S35.

Control then goes back to step S34, in which the speech/no-speech signal detectors 8-1, 8-2 detect whether there is a speech signal based on the data supplied to the finger receivers 3-1, 3-2.

In the fourth embodiments, the two finger receivers are operated at all times. However, it is preferable to select the number of finger receivers that need to be operated, based on the number (preferably 3) of base stations that communicate with the mobile terminal in a soft hand-bver mode in an actual system or zone configuration.

5th Embodiment:

In the fourth embodiment, the two speech/no-speech signal detectors are provided in view of the soft hand-over mode, and the two finger receivers connected to the speech/no-speech signal detectors are operated at all times. The speech/no-speech signal detectors detect whether there is a speech signal or not based on the data w supplied to the two finger receivers, and operation of the other finger receivers is controlled on the basis of detected results from the speech/no-speech signal detectors. However, when no speech signal is detected, if the mobile terminal is in a soft hand-over mode, then at least two finger receivers may be operated, and if the mobile terminal is not in a soft hand-over mode, then only one finger receiver may be operated, so that the current consumed by the mobile terminal when no speech signal is detected can further be reduced.

Figure 11:
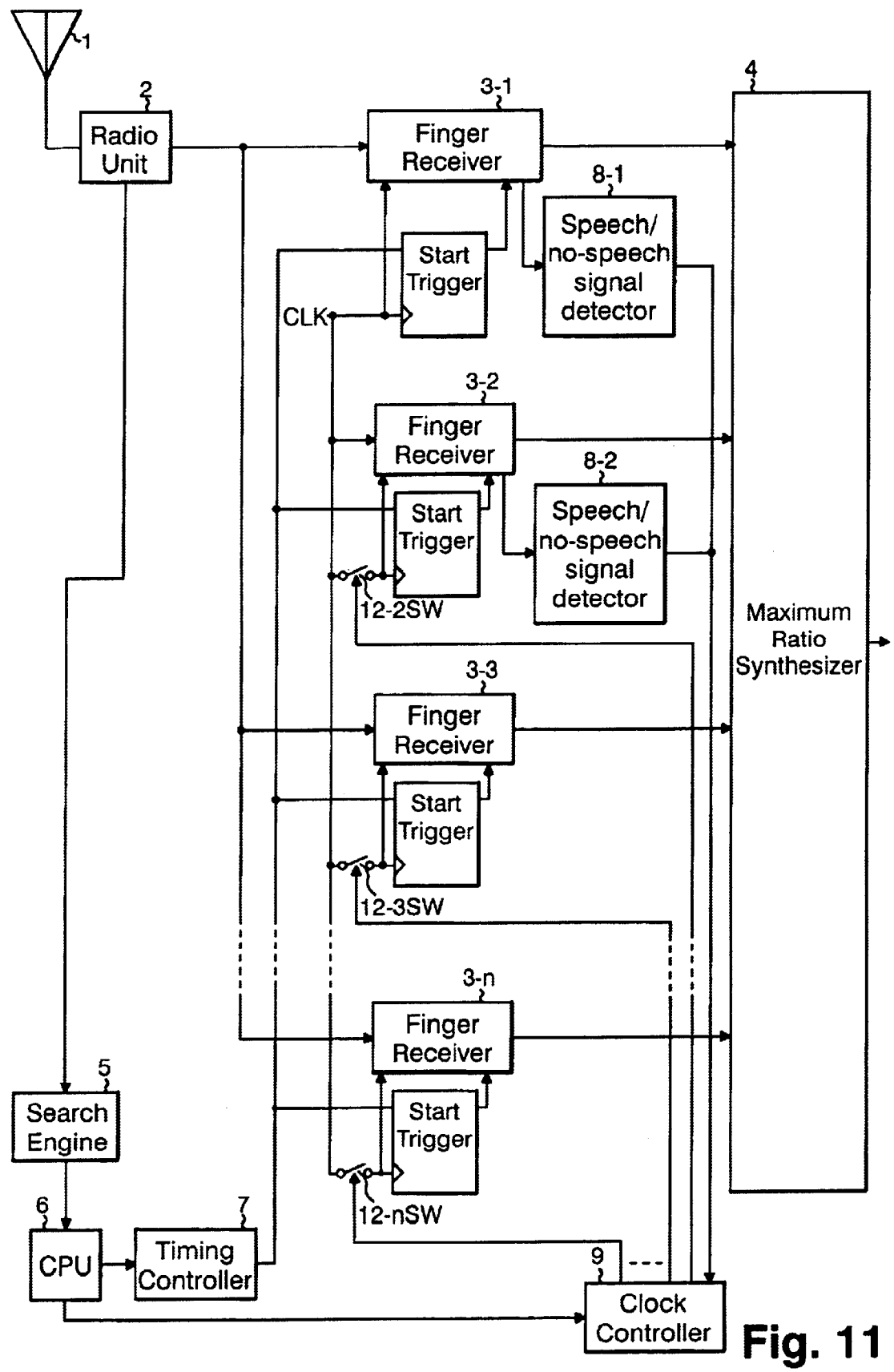
FIG. 11 is a block diagram of a receiving circuit according to a fifth embodiment of the present invention.

FIG. 11 shows in block form a receiving circuit according to a fifth embodiment of the present invention.

As shown in FIG. 11, the receiving circuit comprises an antenna 1 and a radio unit 2 for receiving data, a plurality of finger receivers 3-1 through 3-n for being supplied with the data received via the antenna 1 and the radio unit 2 and inversely diffusing the data in association with a plurality of multiple paths, a maximum ratio synthesizer 4 for synthesizing the data inversely diffused by the finger receivers 3-1 through 3-n, a search engine 5 for detecting respective components of the multiple paths, a timing controller 7 for controlling the timing of operation of the finger receivers 3-1 through 3-n, a CPU 6 for controlling operation of the timing controller 7 based on the components detected by the search engine 5, a pair of speech/no-speech signal detectors 8-1, 8-2 for detecting whether there is a speech signal or not based on the respective data inversely diffused by the finger receivers 3-1, 3-2, a clock controller 9 for controlling the supply of a clock signal to the finger receivers 3-2 through 3-n under the control of the CPU 6 or based on detected results from the speech/no-speech signal detectors 8-1, 8-2, and a plurality of switches 12-2 through 12-n for switching on and off the supply of the clock signal to the finger receivers 3-2 through 3-n under the control of the clock controller 9. The timing controller 7 outputs a frame signal at all times to the finger receivers 3-1 through 3-n for keeping the finger receivers 3-1 through 3-n in synchronism with each other.

A process of controlling operation of the finger receivers 3-1 through 3-n in the receiving circuit shown in FIG. 11 will be described below.

FIG. 12 shows an operation sequence of the receiving circuit shown in FIG. 11.

As shown in FIG. 12, a speech communication session starts between the base station 20a (see FIG. 2) and the mobile terminal 10a (see FIG. 2) in step S41, and data is received via the antenna 1 and the radio unit 2 in step S42. The clock controller 9 turns on or connects all the switches 12-2 through 12-n, supplying the clock signal to all the finger receivers 3-1 through 3-n. The finger receivers 3-1 through 3-n now inversely diffuse the data received via the antenna 1 and the radio unit 2 in step S43.

Then, the speech/no-speech signal detectors 8-1, 8-2 detect whether there is a speech signal based on the data inversely diffused by the finger receivers 3-1, 3-2 in step S44. If a speech signal is detected by at least one of the finger receivers 3-1, 3-2, then control returns to step S43, in which the finger receivers 3-1 through 3-n inversely diffuse the data received via the antenna 1 and the radio unit 2.

If no speech signal is detected by both the finger receivers 3-1, 3-2 in step S44, then the search engine 5 and the CPU 6 decides whether the mobile terminal is in a soft hand-over mode or not in step S45. If the mobile terminal is not in a soft hand-over mode, then the clock controller 9 disconnects or opens the switches 12-2 through 12-n to supply no clock signal to the finger receivers 3-2 through 3-n.

The finger receivers 3-2 through 3-n are inactivated, and the data received via the antenna 1 and the radio unit 2 is inversely diffused by only the finger receiver 3-1 in step S46.

Control then goes back to step S44, in which the speech/no-speech signal detector 8-1 detects whether there is a speech signal based on the data supplied to the finger receiver 3-1.

If the mobile terminal is in a soft hand-over mode in step S45, then the clock controller 9 connects the switch 12-2 and disconnects the switches 12-3 through 12-n, supplying no clock signal to the finger receivers 3-3 through 3-n. At this time, it is assumed that the finger receiver 3-1 receives a signal from one of the base stations and the finger receiver 3-2 receives a signal from the other base station.

The finger receivers 3-3 through 3-n are inactivated, and the data received via the antenna 1 and the radio unit 2 is inversely diffused by only the finger receivers 3-1, 3-2 in step S47.

Control then goes back to step S44, in which the speech/no-speech signal detectors 8-1, 8-2 detect whether there is a speech signal based on the data inversely diffused by the finger receivers 3-1, 3-2.

6th Embodiment:

In the fifth embodiment, the two speech/no-speech signal detectors are provided, and one of the two finger receivers connected to the speech/no-speech signal detectors is operated at all times. When the mobile terminal is in a soft hand-over mode, the two finger receivers connected to the speech/no-speech signal detectors are operated at all times, the speech/no-speech signal detectors detect whether there is a speech signal or not based on the data supplied to the two finger receivers, and operation of the other finger receivers is controlled on the basis of detected results from the speech/no-speech signal detectors. However, a plurality of speech/no-speech signal detectors may be connected respectively to a plurality of finger receivers. One or two of the finger receivers whose correlated value is highest may be operated, and operation of the other finger receivers may controlled on the basis of a detected result or results, indicative of speech signal or no speech signal, from the speech/no-speech signal detector or detectors connected to the one or two of the finger receivers.

Figure 13:
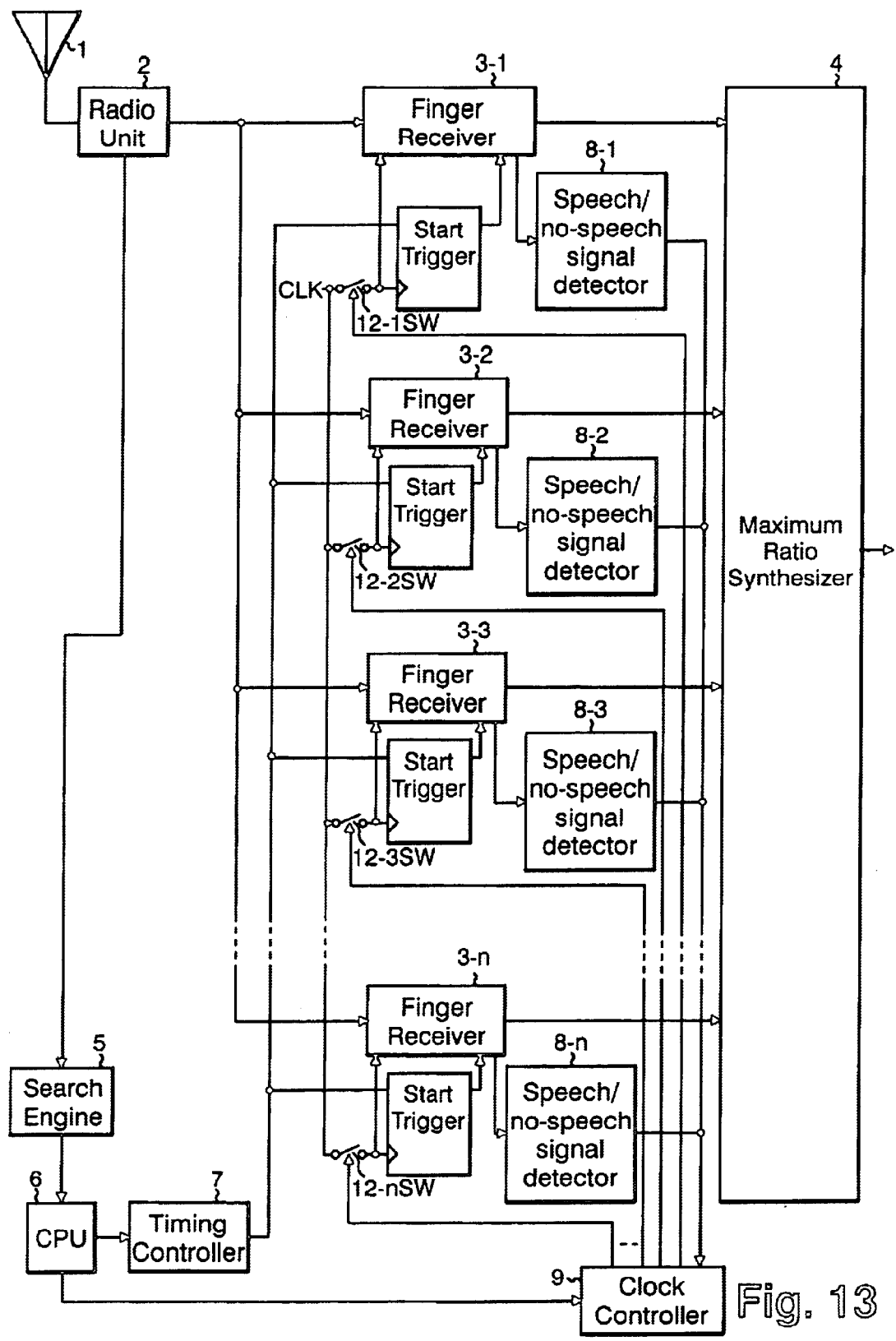
FIG. 13 is a block diagram of a receiving circuit according to a sixth embodiment of the present invention.

FIG. 13 shows in block form a receiving circuit according to a sixth embodiment of the present invention.

As shown in FIG. 13, the receiving circuit comprises an antenna 1 and a radio unit 2 for receiving data, a plurality of finger receivers 3-1 through 3-n for being supplied with the data received via the antenna 1 and the radio unit 2 and inversely diffusing the data in association with a plurality of multiple paths, a maximum ratio synthesizer 4 for synthesizing the data inversely diffused by the finger receivers 3-1 through 3-n, a search engine 5 for detecting respective components of the multiple paths, a timing controller 7 for controlling the timing of operation of the finger receivers 3-1 through 3-n, a CPU 6 for controlling operation of the timing controller 7 based on the components detected by the search engine 5, a plurality of speech/no-speech signal detectors 8-1 through 8-n for detecting whether there is a speech signal or not based on the respective data inversely diffused by the finger receivers 3-1 through 3-n, a clock controller 9 for controlling the supply of a clock signal to the finger receivers 3-1 through 3-n under the control of the CPU 6 or based on detected results from the speech/no-speech signal detectors 8-1 through 8-n, and a plurality of switches 12-1 through 12-n for switching on and off the supply of the clock signal to the finger receivers 3-1 through 3-n under the control of the clock controller 9. The timing controller 7 outputs a frame signal at all times to the finger receivers 3-1 through 3-n for keeping the finger receivers 3-1 through 3-n in synchronism with each other.

A process of controlling operation of the finger receivers 3-1 through 3-n in the receiving circuit shown in FIG. 13 will be described below.

Figure 14:
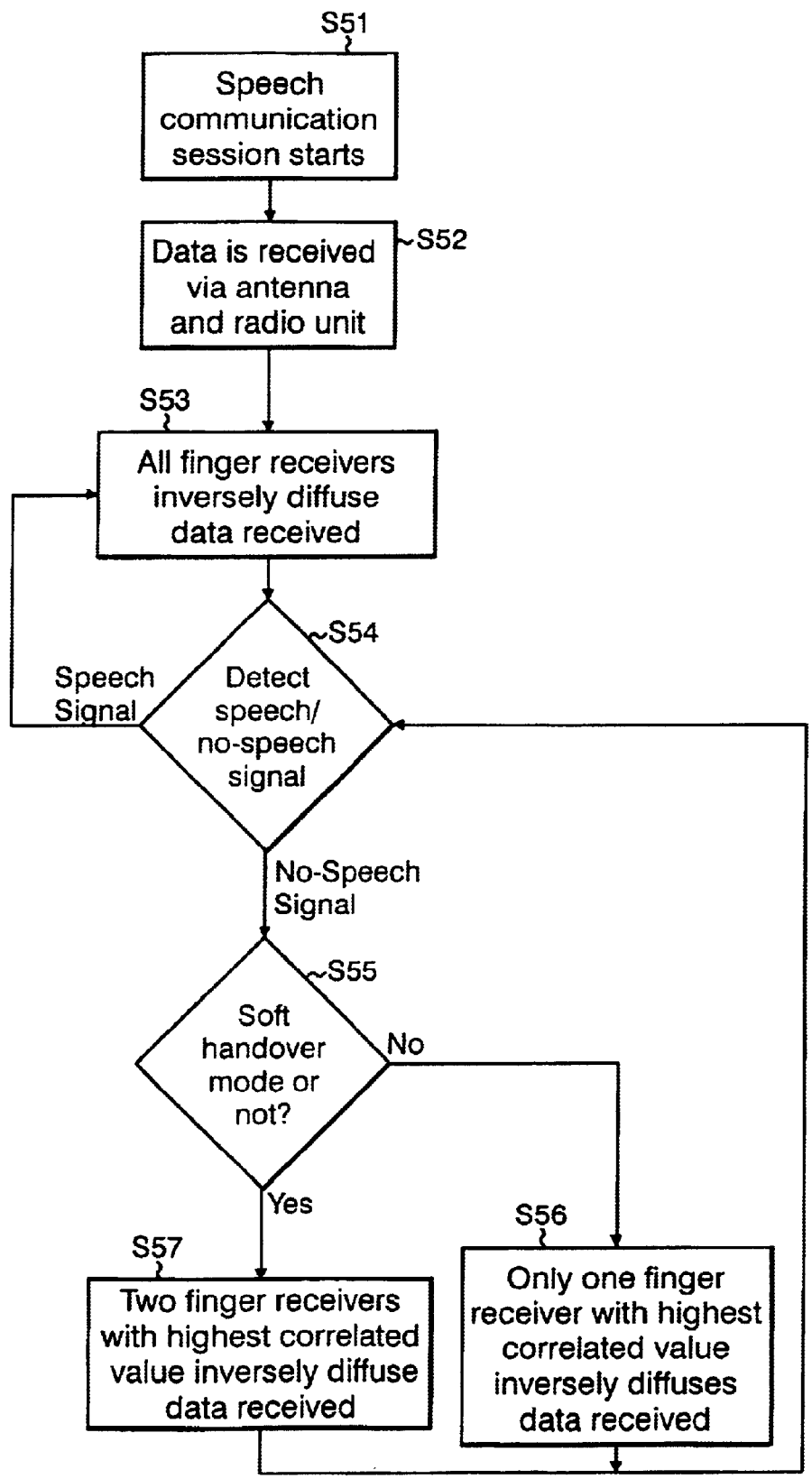
FIG. 14 is a flowchart of an operation sequence of the receiving circuit shown in FIG. 13.

FIG. 14 shows an operation sequence of the receiving circuit shown in FIG. 13.

As shown in FIG. 14, a speech communication session starts between the base station 20a (see FIG. 2) and the mobile terminal 10a (see FIG. 2) in step S51, and data is received via the antenna 1 and the radio unit 2 in step S52. The clock controller 9 turns on or connects all the switches 12-1 through 12-n, supplying the clock signal to all the finger receivers 3-1 through 3-n. The finger receivers 3-1 through 3-n now inversely diffuse the data received via the antenna 1 and the radio unit 2 in step S53.

Then, the speech/no-speech signal detectors 8-1 through 8-n detect whether there is a speech signal based on the data inversely diffused by the finger receivers 3-1 through 3-n in step S54. If a speech signal is detected, then control returns to step S53, in which the finger receivers 3-1 through 3-n inversely diffuse the data received via the antenna 1 and the radio unit 2.

If no speech signal is detected in step S54, then the search engine 5 and the CPU 6 decides whether the mobile terminal is in a soft hand-over mode or not in step S55. If the mobile terminal is not in a soft hand-over mode, then the finger receiver whose correlated value is highest, among the finger receivers 3-1 through 3-n, is indicated from the CPU 6 to the clock controller 9, which controls the switches 12-1 through 12-n to supply the clock signal to the finger receiver whose correlated value is highest and supply no clock signal to the other finger receivers.

If it is assumed that the finger receiver 3-1 has the highest correlated value, then the clock controller 9 connects or closes the switch 12-1 and disconnects or opens the switches 12-2 through 12-n, so that the clock signal is supplied to the finger receiver 3-1 and no clock signal is supplied to the finger receivers 3-2 through 3-n.

The finger receivers 3-2 through 3-n are inactivated, and the data received via the antenna 1 and the radio unit 2 is inversely diffused by only the finger receiver 3-1 in step S56.

Control then goes back to step S54, in which the speech/no-speech signal detector 8-1 detects whether there is a speech signal based on the data inversely diffused by the finger receiver 3-1.

If the mobile terminal is in a soft hand-over mode in step S55, then the finger receiver whose correlated value is highest and the finger receiver whose correlated value is second highest, among the finger receivers 3-1 through 3-n, are indicated from the CPU 6 to the clock controller 9, which controls the switches 12-1 through 12-n to supply the clock signal to the finger receiver whose correlated value is highest and the finger receiver whose correlated value is second highest, and supply no clock signal to the other finger receivers.

If it is assumed that the finger receiver 3-1 has the highest correlated value and the finger receiver 3-2 has the second highest correlated value, then the clock controller 9 connects or closes the switches 12-1, 12-2 and disconnects or opens the switches 12-3 through 12-n, so that the clock signal is supplied to the finger receivers 3-1, 3-2 and no clock signal is supplied to the finger receivers 3-3 through 3-n.

The finger receivers 3-3 through 3-n are inactivated, and the data received via the antenna 1 and the radio unit 2 is inversely diffused by only the finger receivers 3-1, 3-2 in step S57.

Control then goes back to step S54, in which the speech/no-speech signal detectors 8-1, 8-2 detect whether there is a speech signal based on the data inversely diffused by the finger receivers 3-1, 3-2.

In the first through sixth embodiments described above, operation of the finger receivers is controlled on the basis of whether there is a speech signal or not during a speech communication session. However, the present invention is applicable to not only speech communications, but also data communications where received data is burst data, for receiving data in a power saving mode during periods free of such burst data.

According to the present invention, as described above, the receiving circuit has a detecting means for detecting whether there is a speech signal or not based on data inversely diffused by a plurality of finger receivers, and a control means for controlling the number of finger receivers that operate, among the plurality of finger receivers, based on a detected result from the detecting means. If the detecting means detects speech signal, then the control means controls all the finger receivers to operate. If the detecting means detects no speech signal, then the control means controls only one or two of the finger receivers to operate which are required for the detecting means to detect whether there is a speech signal or not. Consequently, the current consumed by the receiving circuit when there is no speech signal can be reduced.

While preferred embodiments of the present invention have been described using specific terms, such description is for illustrative purposes only, and it is to be understood that changes and variations may be made without departing from the spirit or scope of the following claims.

What is claimed is:

1. A receiving circuit comprising:
an antenna and a radio unit for receiving a signal transmitted via a radio link;
a plurality of finger receivers for inversely diffusing the signal received by the antenna and the radio unit in association with respective multiple paths;
a synthesizer for synthesizing signals inversely diffused by said finger receivers;
means for controlling a number of finger receivers to operate, among said plurality of finger receivers, based on whether or not a communication signal is detected by a detection means in the signal received by the antenna and the radio unit; and
means for controlling a number of finger receives to operate if a speech signal or data is not contained in the signal received by the antenna and the radio unit, based on a number of base stations which are communicating with the receiving circuit.

2. A mobile terminal having a receiving circuit according to claim 1.

3. A receiving circuit comprising:
an antenna and a radio unit for receiving a signal transmitted via a radio link;
a plurality of finger receivers for inversely diffusing the signal received by the antenna and the radio unit in association with respective multiple paths;
a synthesizer for synthesizing signals inversely diffused by said finger receivers;
means for controlling a number of finger receivers to operate, among said plurality of finger receivers, based on whether or not a communication signal is detected by a detection means in the signal received by the antenna and the radio unit; and
means for controlling a number of finger receives to operate if a speech signal or data is not contained in the signal received by the antenna and the radio unit, based on whether the receiving circuit is in a soft hand-over mode or not.

4. A mobile terminal having a receiving circuit according to claim 3.

5. A receiving circuit comprising:

an antenna and a radio unit for receiving a signal transmitted via a radio link;

a plurality of finger receivers for inversely diffusing the signal received by the antenna and the radio unit in association with respective multiple paths;

a synthesizer for synthesizing signals inversely diffused by said finger receivers;

means for controlling a number of finger receivers to operate, among said plurality of finger receivers, based on whether or not a communication signal is detected by a detection means in the signal received by the antenna and the radio unit;

means for controlling a number of finger receivers to operate if a speech signal or data is not contained in the signal received by the antenna and the radio unit, based on whether the receiving circuit is in a soft hand-over mode or not; and means for operating as many finger receivers as a number of base stations which are communicating with the receiving circuit if the receiving circuit is in the soft hand-over mode, and operating a minimum number of finger receivers required to detect whether or not a speech signal or data is contained in the signal received by the antenna and the radio unit, if the receiving circuit is not in the soft hand-over mode.

6. A receiving circuit comprising:

an antenna and a radio unit for receiving a signal transmitted via a radio link;

a plurality of finger receivers for inversely diffusing the signal received by the antenna and the radio unit in association with respective multiple paths;

a synthesizer for synthesizing signals inversely diffused by said finger receivers;

means for controlling a number of finger receivers to operate, among said plurality of finger receivers, based on whether or not a communication signal is detected by a detection means in the signal received by the antenna and the radio unit; and means for controlling the number of finger receivers to operate by controlling a supply of a clock signal to said plurality of finger receivers.

7. A mobile terminal having a receiving circuit according to claim 6.

8. A receiving circuit comprising:

an antenna and a radio unit for receiving a signal transmitted via a radio link;

a plurality of finger receivers for inversely diffusing the signal received by the antenna and the radio unit in association with respective multiple paths;

a synthesizer for synthesizing signals inversely diffused by said finger receivers;

means for controlling a number of finger receivers to operate, among said plurality of finger receivers, based on whether or not a communication signal is detected by a detection means in the signal received by the antenna and the radio unit;

means for controlling a number of finger receivers to operate if a speech signal or data is not contained in the signal received by the antenna and the radio unit, based on a number of base stations which are communicating with the receiving circuit; and means for controlling the number of finger receivers to operate by controlling a supply of a clock signal to said plurality of finger receivers.

9. A receiving circuit comprising:

an antenna and a radio unit for receiving a signal transmitted via a radio link;

a plurality of finger receivers for inversely diffusing the signal received by the antenna and the radio unit in association with respective multiple paths;

a synthesizer for synthesizing signals inversely diffused by said finger receivers;

means for controlling a number of finger receivers to operate, among said plurality of finger receivers, based on whether or not a communication signal is detected by a detection means in the signal received by the antenna and the radio unit;

means for controlling a number of finger receivers to operate if a speech signal or data is not contained in the signal received by the antenna and the radio unit, based on whether the receiving circuit is in a soft hand-over mode or not; and means for controlling the number of finger receivers to operate by controlling a supply of a clock signal to said plurality of finger receivers.

10. A receiving circuit comprising:

an antenna and a radio unit for receiving a signal transmitted via a radio link;

a plurality of finger receivers for inversely diffusing the signal received by the antenna and the radio unit in association with respective multiple paths;

a synthesizer for synthesizing signals inversely diffused by said finger receivers;

means for controlling a number of finger receivers to operate, among said plurality of finger receivers, based on whether or not a communication signal is detected by a detection means in the signal received by the antenna and the radio unit;

means for controlling a number of finger receivers to operate if a speech signal or data is not contained in the signal received by the antenna and the radio unit, based on whether the receiving circuit is in a soft hand-over mode or not;

means for operating as many finger receivers as a number of base stations which are communicating with the receiving circuit if the receiving circuit is in the soft hand-over mode, and operating a minimum number of finger receivers required to detect whether or not a speech signal or data is contained in the signal received by the antenna and the radio unit, if the receiving circuit is not in the soft hand-over mode; and means for controlling the number of finger receivers to operate by controlling a supply of a clock signal to said plurality of finger receivers.

11. A receiving circuit comprising:

an antenna and a radio unit for receiving data;

a plurality of finger receivers for inversely diffusing the data received by the antenna and the radio unit in association with respective multiple paths;

a synthesizer for synthesizing signals inversely diffused by said finger receivers;

detecting means for detecting whether there is a speech signal or not based on the data inversely diffused by said finger receivers; and control means for controlling a number of finger receivers to operate, among said plurality of finger receivers, based on a detected result from said detecting means.

12. A receiving circuit according to claim 11, wherein said control means comprises means for operating all the finger receivers if a speech signal is detected by said detecting means.

13. A receiving circuit according to claim 11 wherein at least one of said finger receivers is operated at all times without being controlled by said control means, and said detecting means comprises means for detecting whether there is a speech signal or not based on data inversely diffused by said at least one of the finger receivers.

14. A receiving circuit according to claim 11, wherein said detecting means comprises two detecting means associated respectively with two of said plurality of finger receivers, and said control means comprises means for operating the two finger receivers associated with said two detecting means at all times irrespective of detected results from said detecting means and controlling operation of other finger receivers based on the detected results from said detecting means if the receiving circuit is in a hand-over mode, and operating one of the two finger receivers associated with said two detecting means at all times irrespective of detected results form said detecting means and controlling operation of other finger receivers based on the detected results from said detecting means if the receiving circuit is not in the hand-over mode.

15. A receiving circuit according to claim 11, wherein at least two of said finger receivers are operated at all times without being controlled by said control means, and said detecting means comprises means for detecting whether there is a speech signal or not based on data inversely diffused by said at least two of the finger receivers.

16. A receiving circuit according to claim 11, wherein said detecting means comprises a plurality of detecting means associated with said plurality of finger receivers, respectively.

17. A receiving circuit according to claim 7, wherein said control means comprises means for controlling operation of said plurality of finger receivers by controlling supply of a clock signal to said plurality of finger receivers.

18. A mobile terminal having a receiving circuit according to claim 11.

19. A receiving circuit according to claim 12, wherein at least one of said finger receivers is operated at all times without being controlled by said control means, and said detecting means comprises means for detecting whether there is a speech signal or not based on data inversely diffused by said at least one of the finger receivers.

20. A receiving circuit according to claim 12, wherein at least two of said finger receivers are operated at all times without being controlled by said control means, and said detecting means comprises means for detecting whether there is a speech signal or not based on data inversely diffused by said at least two of the finger receivers.

21. A receiving circuit according to claim 12, wherein said detecting means comprises a plurality of detecting means associated with said plurality of finger receivers, respectively.

22. A receiving circuit according to claim 12, wherein said detecting means comprises two detecting means associated respectively with two of said plurality of finger receivers, and said control means comprises means for operating the two finger receivers associated with said two detecting means at all times irrespective of detected results from said detecting means and controlling operation of other finger receivers based on the detected results from said detecting means if the receiving circuit is in a hand-over mode, and operating one of the two finger receivers associated with said two detecting means at all times irrespective of detected results from said detecting means and controlling operation of other finger receivers based on the detected results from said detecting means if the receiving circuit is not in the hand-over mode.

23. A receiving circuit according to claim 16, wherein said control means comprises means for operating, at all times, one of said plurality of fingers receivers which has a highest correlated value, and controlling operation of other finger receivers based on a detected result from the detecting means associated with said one of the finger receivers.

24. A receiving circuit according to claim 16, wherein said control means comprises means for operating, at all times, two of said plurality of finger receivers which have a highest correlated value irrespective of detected results from said detecting means, and controlling operation of other finger receivers based on detected results from the detecting means associated with said two of the finger receivers, if the receiving circuit is in a hand-over mode, and operating, at all times, one of said plurality of finger receivers which has a highest correlated value irrespective of detected results from said detecting means, and controlling operation of other finger receivers based on a detected result from the detecting means associated with said one of the finger receivers, if the receiving circuit is not in the hand-over mode.

25. A receiving circuit according to claim 16, wherein said control means comprises means for controlling operation of said plurality of finger receivers by controlling a supply of a clock signal to said plurality of finger receivers.

26. A mobile terminal having a receiving circuit according to claim 16.

27. A receiving circuit according to claim 21, wherein said control means comprises means for operating, at all times, one of said plurality of finger receivers which has a highest correlated value, and controlling operation of other finger receivers based on a detected result from the detecting means associated with said one of the finger receivers.

28. A receiving circuit according to claim 21, wherein said control means comprises means for operating, at all times, two of said plurality of ginger receivers which have a highest correlated value irrespective of detected results from said detecting means, and controlling operation of other finger receivers based on detected results from the detecting means associated with said two of the finger receivers, if the receiving circuit is in a hand-over mode, and operating, at all times, one of said plurality of finger receivers which has a highest correlated value irrespective of detected results from said detecting means, and controlling operation of other finger receivers based on a detected result from the detecting means associated with said one of the finger receivers, if the receiving circuit is not in the hand-over mode.

29. A receiving circuit comprising:
    an antenna and a radio unit for receiving data;
    a plurality of finger receivers for inversely diffusing the data received by the antenna and the radio unit in association with respective multiple paths;
    a synthesizer for synthesizing signals inversely diffused by said finger receivers;
    a decoder for decoding the data synthesized by said synthesizer;
    detecting means for detecting whether there is a speech signal or not based on the data decoded by said decoder; and
    control means for controlling a number of finger receivers to operate, among said plurality of finger receivers, based on a detected result form said detecting means.

30. A receiving circuit according to claim 29, wherein said control means comprises means for operating all the finger receivers if a speech signal is detected by said detecting means.

31. A receiving circuit according to claim 29, wherein said control means comprises means for operating, at all times, one of said plurality of finger receivers which has a highest correlated value.

32. A receiving circuit according to claim 29, wherein said control means comprises means for controlling operation of said plurality of finger receivers by controlling a supply of a clock signal to said plurality of finger receivers.

33. A mobile terminal having a receiving circuit according to claim 29.

34. A receiving circuit according to claim 30, wherein said control means comprises means for operating, at all times, one of said plurality of finger receivers which as a highest correlated value.

35. A mobile terminal having a receiving circuit according to claim 17.

36. A method of receiving data by inversely diffusing a signal received by an antenna and a radio unit with a plurality of receivers of a receiving circuit in association with respective multiple paths, synthesizing inversely diffused signals, and outputting a synthesized signal, comprising the steps of:

controlling a number of receivers to operate, among said plurality of receivers, based on whether or not a communication signal is detected by a detection means received by the antenna and the radio unit; and controlling the number of receivers to operate if a speech signal or data is not contained in the signal received by the antenna and the radio unit, based on a number of base stations which are communicating with the receiving circuit.

37. A method of receiving data by inversely diffusing a signal received by an antenna and a radio unit with a plurality of receivers of a receiving circuit in association with respective multiple paths, synthesizing inversely diffused signals, and outputting a synthesized signal, comprising the steps of:

controlling a number of receivers to operate, among said plurality of receivers, based on whether or not a communication signal is detected by a detection means in the signal received by the antenna and the radio unit; and controlling the number of receivers to operate if a speech signal or data is not contained in the signal received by the antenna and the radio unit, based on whether a receiving circuit is in a soft hand-over mode or not.

38. A method of receiving data by inversely diffusing a signal received by an antenna and a radio unit with a plurality of receivers of a receiving circuit in association with respective multiple paths, synthesizing inversely diffused signals, and outputting a synthesized signal, comprising the steps of:

controlling a number of receivers to operate, among said plurality of receivers, based on whether or not a communication signal is detected by a detection means in the signal received by the antenna and the radio unit;

controlling the number of receivers to operate if a speech signal or data is not contained in the signal received by the antenna and the radio unit, based on whether a receiving circuit is in a soft hand-over mode or not;

operating as many finger receivers as a number of base stations which are communicating with the receiving circuit if the receiving circuit is in the soft hand-over mode; and operating a minimum number of finger receivers required to detect whether or not a speech signal or data is contained in the signal received by the antenna and the radio unit, if the receiving circuit is not in the soft hand-over mode.

39. A method of receiving data by inversely diffusing a signal received by an antenna and a radio unit with a plurality of receivers of a receiving circuit in association with respective multiple paths, synthesizing inversely diffused signals, and outputting a synthesized signal, comprising the steps of:

controlling a number of receivers to operate, among said plurality of receivers, based on whether or not a communication signal is detected by a detection means in the signal received by the antenna and the radio unit; and controlling the number of receivers to operate by controlling a supply of a clock signal to said plurality of receivers.

40. A method of receiving data by inversely diffusing a signal received by an antenna and a radio unit with a plurality of receivers of a receiving circuit in association with respective multiple paths, synthesizing inversely diffused signals, and outputting a synthesized signal, comprising the steps of:

controlling a number of receivers to operate, among said plurality of receivers, based on whether or not a communication signal is detected by a detection means in the signal received by the antenna and the radio unit;

controlling the number of receivers to operate if a speech signal or data is not contained in the signal received by the antenna and the radio unit, based on a number of base stations which are communicating with the receiving circuit; and controlling the number of receivers to operate by controlling a supply of a clock signal to said plurality of receivers.

41. A method of receiving data by inversely diffusing a signal received by an antenna and a radio unit with a plurality of receivers of a receiving circuit in association with respective multiple paths, synthesizing inversely diffused signals, and outputting a synthesized signal, comprising the steps of:

controlling a number of receivers to operate, among said plurality of receivers, based on whether or not a communication signal is detected by a detection means in the signal received by the antenna and the radio unit;

controlling the number of receivers to operate if a speech signal or data is not contained in the signal received by the antenna and the radio unit, based on whether a receiving circuit is in a soft hand-over mode or not; and controlling the number of receivers to operate by controlling a supply of a clock signal to said plurality of receivers.

42. A method of receiving data by inversely diffusing a signal received by an antenna and a radio unit with a plurality of receivers of a receiving circuit in association with respective multiple paths, synthesizing inversely diffused signals, and outputting a synthesized signal, comprising the steps of:

controlling a number of receivers to operate, among said plurality of receivers, based on whether or not a communication signal is detected by a detection means in the signal received by the antenna and the radio unit;

controlling the number of receivers to operate if a speech signal or data is not contained in the signal received by the antenna and the radio unit, based on whether a receiving circuit is in a soft hand-over mode or not;

operating as many finger receivers as a number of base stations which are communicating with the receiving circuit if the receiving circuit is in the soft hand-over mode;

operating a minimum number of finger receivers required to detect whether or not a speech signal or data is contained in the signal received by the antenna and the radio unit, if the receiving circuit is not in the soft hand-over mode; and controlling the number of receivers to operate by controlling a supply of a clock signal to said plurality of receivers.

43. A method of receiving data by inversely diffusing data received by an antenna and a radio unit with a plurality of receivers of a receiving circuit in association with respective multiple paths, synthesizing inversely diffused data, and outputting synthesized data, comprising the steps of:

detecting whether there is a speech signal or not based on the inversely diffused data; and controlling a number of receivers to operate, among said plurality of receivers, based on a detected result of whether there is a speech signal or not.

44. A method according to claim 43, further comprising the step of operating all the receivers if a speech signal is detected.

45. A method according to claim 43, further comprising the step of operating at least one of said plurality of receivers at all times.

46. A method according to claim 43, further comprising the step of operating at least two of said plurality of receivers at all times.

47. A method according to claim 43, further comprising the step of operating, at all times, one of said plurality of receivers which has a highest correlated value.

48. A method according to claim 43, further comprising the steps of:

operating at least two of said receivers at all times if the receiving circuit is in a hand-over mode; and operating one of said receivers at all times if the receiving circuit is not in the hand-over mode.

49. A method according to claim 43, further comprising the step of controlling operation of said plurality of receivers by controlling a supply of a clock signal to said plurality of receivers.

50. A method according to claim 44, further comprising the step of operating at least one of said plurality of receivers at all times.

51. A method according to claim 44, further comprising the step of operating at least two of said plurality of receivers at all times.

52. A method according to claim 44, further comprising the step of operating, at all times, one of said plurality of receivers which has a highest correlated value.

53. A method according to claim 44, further comprising the steps of:

operating at least two of said times if the receiving circuit is in a hand-over mode; and operating one of said receivers at all times if the receiving circuit is not in the hand-over mode.

54. A method according to claim 44, further comprising the step of controlling operation of said plurality of receivers by controlling a supply of a clock signal to said plurality of receivers.

55. A method according to claim 48, further comprising the steps of:

operating two of said receivers which have a highest correlated value at all times if the receiving circuit is in the hand-over mode; and operating one of said receivers which has a highest correlated value at all times if the receiving circuit is not in the hand-over mode.

56. A method according to claim 48, further comprising the step of controlling operation of said plurality of receivers by controlling a supply of a clock signal to said plurality of receivers.

57. A method of receiving data by inversely diffusing data received by an antenna and a radio unit with a plurality of receivers of a receiving circuit in association with respective multiple paths, synthesizing inversely diffused data, decoding synthesized data, and outputting decoded data, comprising the steps of:

detecting whether there is a speech signal or not based on the decoded data; and controlling a number of receivers to operate, among said plurality of receivers, based on a detected result of whether there is a speech signal or not, wherein all of the receivers are operated if a speech signal is detected.

58. A method according to claim 57, further comprising the step of:

operating, at all times, one of said plurality of receivers which has a highest correlated value.

59. A method of receiving data by inversely diffusing data received by an antenna and a radio unit with a plurality of receivers of a receiving circuit in association with respective multiple paths, synthesizing inversely diffused data, decoding synthesized data, and outputting decoded data, comprising the steps of:

detecting whether there is a speech signal or not based on the decoded data;

controlling a number of receivers to operate, among said plurality of receivers, based on a detected result of whether there is a speech signal or not, wherein all of the receivers are operated if a speech signal is detected; and controlling operation of said plurality of receivers by controlling a supply of a clock signal to said plurality of receivers.

* * * * *